(12) United States Patent
Tso et al.

(10) Patent No.: US 11,028,258 B2
(45) Date of Patent: Jun. 8, 2021

(54) METALLOCENE CATALYST SYSTEM FOR PRODUCING LLDPE COPOLYMERS WITH TEAR RESISTANCE AND LOW HAZE

(71) Applicant: Chevron Phillips Chemical Company LP, The Woodlands, TX (US)

(72) Inventors: Chung Ching Tso, Bartlesville, OK (US); Errun Ding, Mason, OH (US); Randall S. Muninger, Dewey, OK (US); John T. Blagg, Nowata, OK (US); Yongwoo Inn, Bartlesville, OK (US); Max P. McDaniel, Bartlesville, OK (US); Ashish M. Sukhadia, Bartlesville, OK (US); Sarah Eppinger, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 26 days.

(21) Appl. No.: 16/543,686

(22) Filed: Aug. 19, 2019

(65) Prior Publication Data

US 2021/0054178 A1    Feb. 25, 2021

(51) Int. Cl.
*C08L 23/16* (2006.01)
*C08F 210/16* (2006.01)
(Continued)

(52) U.S. Cl.
CPC ............ *C08L 23/06* (2013.01); *C08F 4/6592* (2013.01); *C08F 210/16* (2013.01); *C08L 23/16* (2013.01); *C08L 2201/10* (2013.01); *C08L 2203/16* (2013.01); *C08L 2207/066* (2013.01); *C08L 2314/02* (2013.01)

(58) Field of Classification Search
CPC .... C08F 210/16; C08F 210/00; C08F 210/02; C08F 10/00; C08F 10/02; C08L 23/16; C08L 2203/16; C08L 2201/10
See application file for complete search history.

(56) References Cited

U.S. PATENT DOCUMENTS 3,242,099 A    3/1966 Manyik et al.
3,248,179 A    4/1966 Norwood
(Continued)

FOREIGN PATENT DOCUMENTS

EP    1871815 B1    11/2009

OTHER PUBLICATIONS

International Search Report and Written Opinion issued in corresponding application No. PCT/US2020/045833, dated Nov. 16, 2020, 9 pages.

(Continued)

*Primary Examiner* — Rip A Lee
(74) *Attorney, Agent, or Firm* — Merchant & Gould P.C.

(57) ABSTRACT

Ethylene polymers having a density from 0.908 to 0.925 g/cm$^3$, a melt index from 0.5 to 3 g/10 min, a ratio of Mw/Mn from 2 to 4, a ratio of Mz/Mw from 1.6 to 2.3, a CY-a parameter from 0.45 to 0.6, and an ATREF profile characterized by a single peak at a peak ATREF temperature from 76 to 88° C., and by less than 4.5 wt. % of the polymer eluting above a temperature of 91° C. These ethylene polymers can be used to produce various articles of manufacture, such as blown and cast films with a beneficial combination of high tear resistance and low haze.

21 Claims, 9 Drawing Sheets

(51) Int. Cl.
*C08L 23/06* (2006.01)
*C08F 4/6592* (2006.01)

(56) References Cited

U.S. PATENT DOCUMENTS

| | | | |
|---|---|---|---|
| 4,501,885 A | 2/1985 | Sherk et al. | |
| 4,588,790 A | 5/1986 | Jenkins, III et al. | |
| 4,794,096 A | 12/1988 | Ewen | |
| 4,808,561 A | 2/1989 | Welborn, Jr. | |
| 5,352,749 A | 10/1994 | DeChellis et al. | |
| 5,436,304 A | 7/1995 | Griffin et al. | |
| 5,565,175 A | 10/1996 | Hottovy et al. | |
| 5,575,979 A | 11/1996 | Hanson | |
| 5,576,259 A | 11/1996 | Hasegawa et al. | |
| 5,807,938 A | 9/1998 | Kaneko et al. | |
| 5,919,983 A | 7/1999 | Rosen et al. | |
| 6,107,230 A | 8/2000 | McDaniel et al. | |
| 6,165,929 A | 12/2000 | McDaniel et al. | |
| 6,239,235 B1 | 5/2001 | Hottovy et al. | |
| 6,262,191 B1 | 7/2001 | Hottovy et al. | |
| 6,294,494 B1 | 9/2001 | McDaniel et al. | |
| 6,300,271 B1 | 10/2001 | McDaniel et al. | |
| 6,316,553 B1 | 11/2001 | McDaniel et al. | |
| 6,355,594 B1 | 3/2002 | McDaniel et al. | |
| 6,376,415 B1 | 4/2002 | McDaniel et al. | |
| 6,388,017 B1 | 5/2002 | McDaniel et al. | |
| 6,391,816 B1 | 5/2002 | McDaniel et al. | |
| 6,395,666 B1 | 5/2002 | McDaniel et al. | |
| 6,524,987 B1 | 2/2003 | Collins et al. | |
| 6,548,441 B1 | 4/2003 | McDaniel et al. | |
| 6,548,442 B1 | 4/2003 | McDaniel et al. | |
| 6,576,583 B1 | 6/2003 | McDaniel et al. | |
| 6,613,712 B1 | 9/2003 | McDaniel et al. | |
| 6,632,894 B1 | 10/2003 | McDaniel et al. | |
| 6,667,274 B1 | 12/2003 | Hawley et al. | |
| 6,750,302 B1 | 6/2004 | McDaniel et al. | |
| 6,833,415 B2 | 12/2004 | Kendrick et al. | |
| 7,199,073 B2 | 4/2007 | Martin et al. | |
| 7,226,886 B2 | 6/2007 | Jayaratne et al. | |
| 7,294,599 B2 | 11/2007 | Jensen et al. | |
| 7,312,283 B2 | 12/2007 | Martin et al. | |
| 7,531,606 B2 | 5/2009 | Hendrickson | |
| 7,547,754 B2 | 6/2009 | McDaniel et al. | |
| 7,572,875 B2 | 8/2009 | Jensen et al. | |
| 7,598,327 B2 | 10/2009 | Shaw | |
| 7,601,665 B2 | 10/2009 | McDaniel et al. | |
| 7,619,047 B2 | 11/2009 | Yang et al. | |
| 7,884,163 B2 | 2/2011 | McDaniel et al. | |
| 8,114,946 B2 | 2/2012 | Yang et al. | |
| 8,309,485 B2 | 11/2012 | Yang et al. | |
| 8,344,068 B2 * | 1/2013 | Michie, Jr. | C08L 23/26 |
| | | | 525/191 |
| 8,623,973 B1 | 1/2014 | McDaniel et al. | |
| 8,822,608 B1 | 9/2014 | Bhandarkar et al. | |
| 9,023,959 B2 | 5/2015 | McDaniel et al. | |
| 9,079,991 B2 * | 7/2015 | Ker | C08F 210/16 |
| 9,115,233 B2 * | 8/2015 | Ker | B32B 27/06 |
| 9,181,369 B2 * | 11/2015 | Tso | C08L 23/0807 |
| 9,441,061 B2 | 9/2016 | Tso | |
| 10,000,594 B2 * | 6/2018 | Hlavinka | C08F 210/16 |
| 10,358,506 B2 * | 7/2019 | Ding | C08F 4/64 |
| 10,435,527 B2 * | 10/2019 | Praetorius | C08J 5/18 |
| 2019/0040160 A1 | 2/2019 | Wang et al. | |
| 2019/0092912 A1 | 3/2019 | Praetorius et al. | |
| 2020/0308378 A1 * | 10/2020 | Praetorius | C08L 23/06 |

OTHER PUBLICATIONS

Total Petrochemicals USA, Inc., "Second Generation Metallocene Polyethylene Film Resins," M 2710 EP, 8 pages.
IUPAC Compendium of Chemical Terminology, 2nd Ed. (1997).
Modern Plastics Encyclopedia, Mid-Nov. 1995 Issue, vol. 72, No. 12, 3 pages.
Film Extrusion Manual—Process, Materials, Properties, TAPPI Press, 1992, 16 pages.
Hieber et al., entitled "Some correlations involving the shear viscosity of polystyrene melts," Rheologica Acta, 1989, vol. 28, pp. 321-332.
Hieber et al., entitled "Shear-Rate-Dependence Modeling of Polymer Melt Viscosity," Polymer Engineering and Science, 1992, 32(14), pp. 931-938.
Bird et al., entitled "Dynamics of Polymeric Liquids," vol. 1, Fluid Mechanics, 2nd Edition, John Wiley & Sons, 1987, 3 pages.

* cited by examiner

METALLOCENE CATALYST SYSTEM FOR PRODUCING LLDPE COPOLYMERS WITH TEAR RESISTANCE AND LOW HAZE

BACKGROUND OF THE INVENTION

Polyolefins such as high density polyethylene (HDPE) homopolymer and linear low density polyethylene (LLDPE) copolymer can be produced using various combinations of catalyst systems and polymerization processes. Ziegler-Natta and chromium-based catalyst systems can, for example, produce ethylene polymers having good extrusion processability and polymer melt strength and bubble stability in blown film applications, typically due to their broad molecular weight distribution (MWD). Metallocene based catalyst systems can, for example, produce ethylene polymers having excellent impact strength (e.g. dart impact), but often at the expense of tear resistance.

In some end-uses, such as blown film and cast film applications, it can be beneficial to have the impact properties of a metallocene-catalyzed LLDPE copolymer, but with improved tear resistance in combination with good optical properties. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

In one aspect, the present invention encompasses ethylene polymers (e.g., ethylene/α-olefin copolymers) characterized by a density in a range from about 0.908 to about 0.925 g/cm$^3$, a melt index in a range from about 0.5 to about 3 g/10 min, a ratio of Mw/Mn in a range from about 2 to about 4, a ratio of Mz/Mw in a range from about 1.6 to about 2.3, a CY-a parameter in a range from about 0.45 to about 0.6, and an ATREF profile characterized by a single peak at a peak ATREF temperature in a range from about 76 to about 88° C., and by less than or equal to about 4.5 wt. % of the polymer eluting above a temperature of 91° C.

In another aspect, the present invention encompasses ethylene polymers (e.g., ethylene/α-olefin copolymers) characterized by a density in a range from about 0.908 to about 0.925 g/cm$^3$, a melt index in a range from about 0.5 to about 3 g/10 min, a ratio of Mw/Mn in a range from about 2 to about 4, a ratio of Mz/Mw in a range from about 1.6 to about 2.3, a CY-a parameter in a range from about 0.45 to about 0.6, an ATREF profile characterized by a single peak at a peak ATREF temperature in a range from about 76 to about 90° C., by less than or equal to about 12 wt. % of the polymer eluting above a temperature of 91° C., and by less than or equal to about 0.1 wt. % of the polymer eluting above a temperature of 100° C.

These ethylene polymers can be used to produce various articles of manufacture, such as films (e.g., blown films and cast films), sheets, pipes, geomembranes, and molded products. Beneficially, films comprising or produced from the disclosed ethylene polymers have low haze and high tear resistance, such as haze values of less than 8% and MD tear strengths over 250 g/mil.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
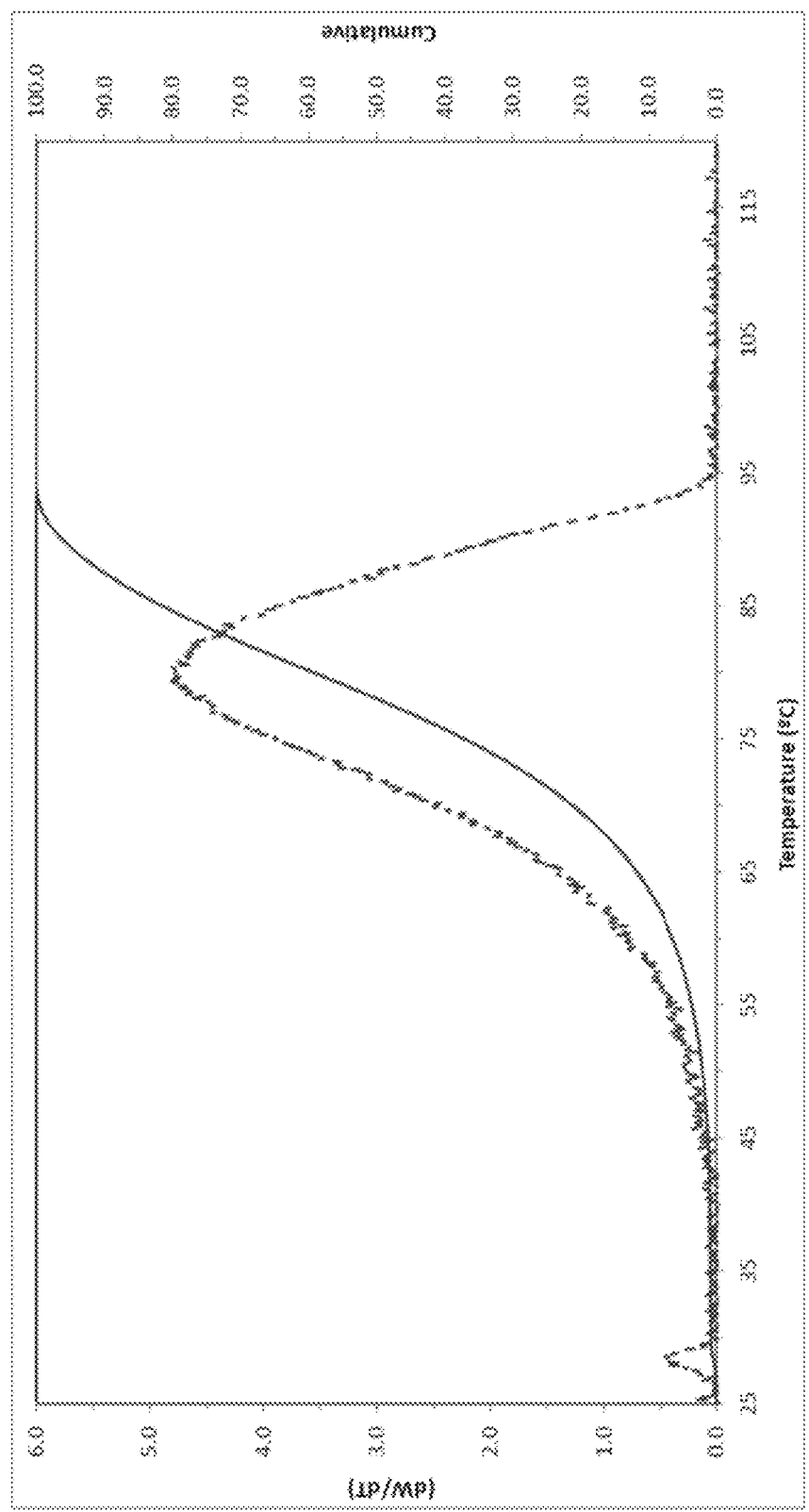
FIG. 1 presents a plot of the ATREF profile of the polymer of Example 1.
Figure 2:
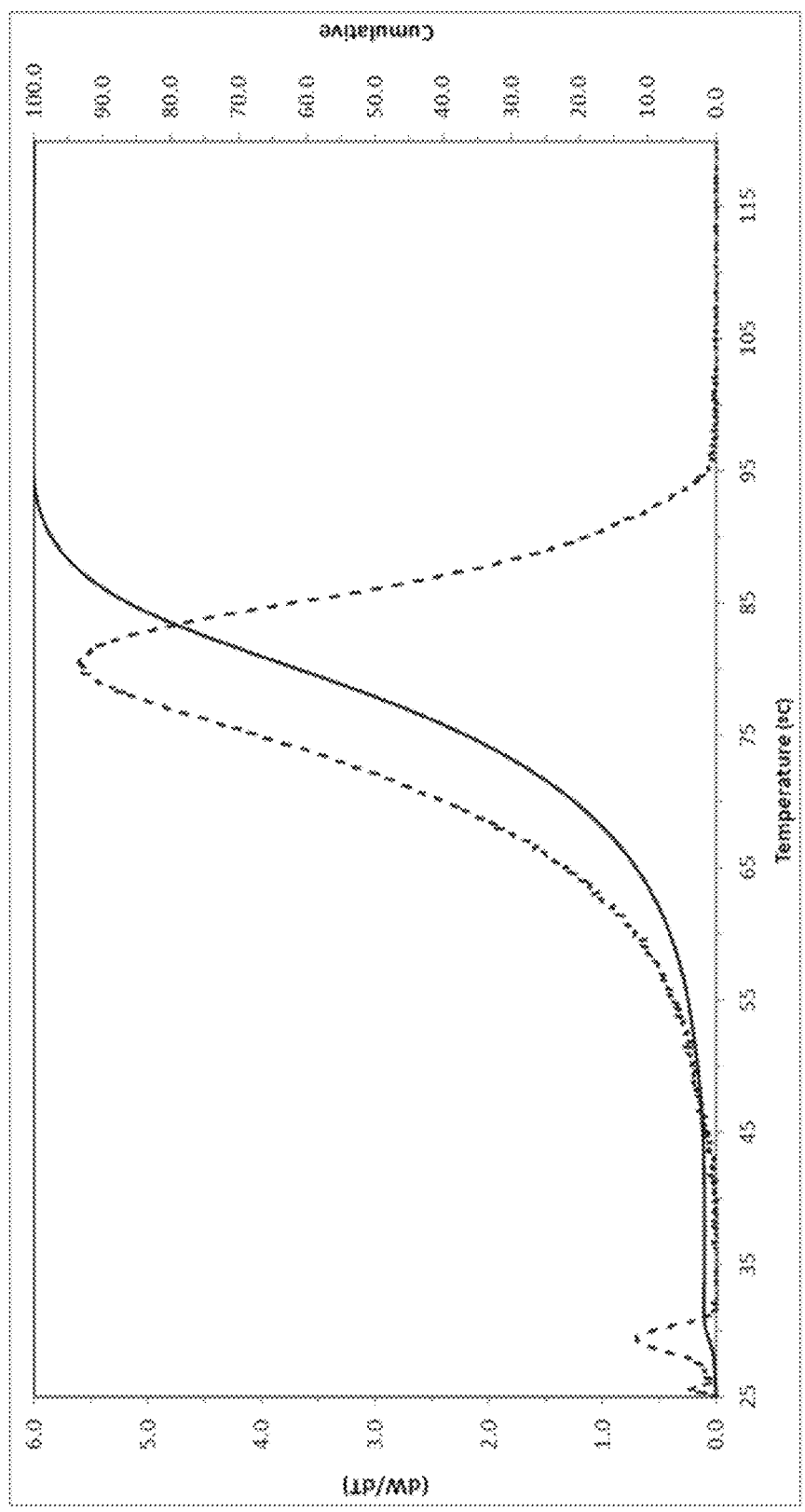
FIG. 2 presents a plot of the ATREF profile of the polymer of Example 2.
Figure 3:
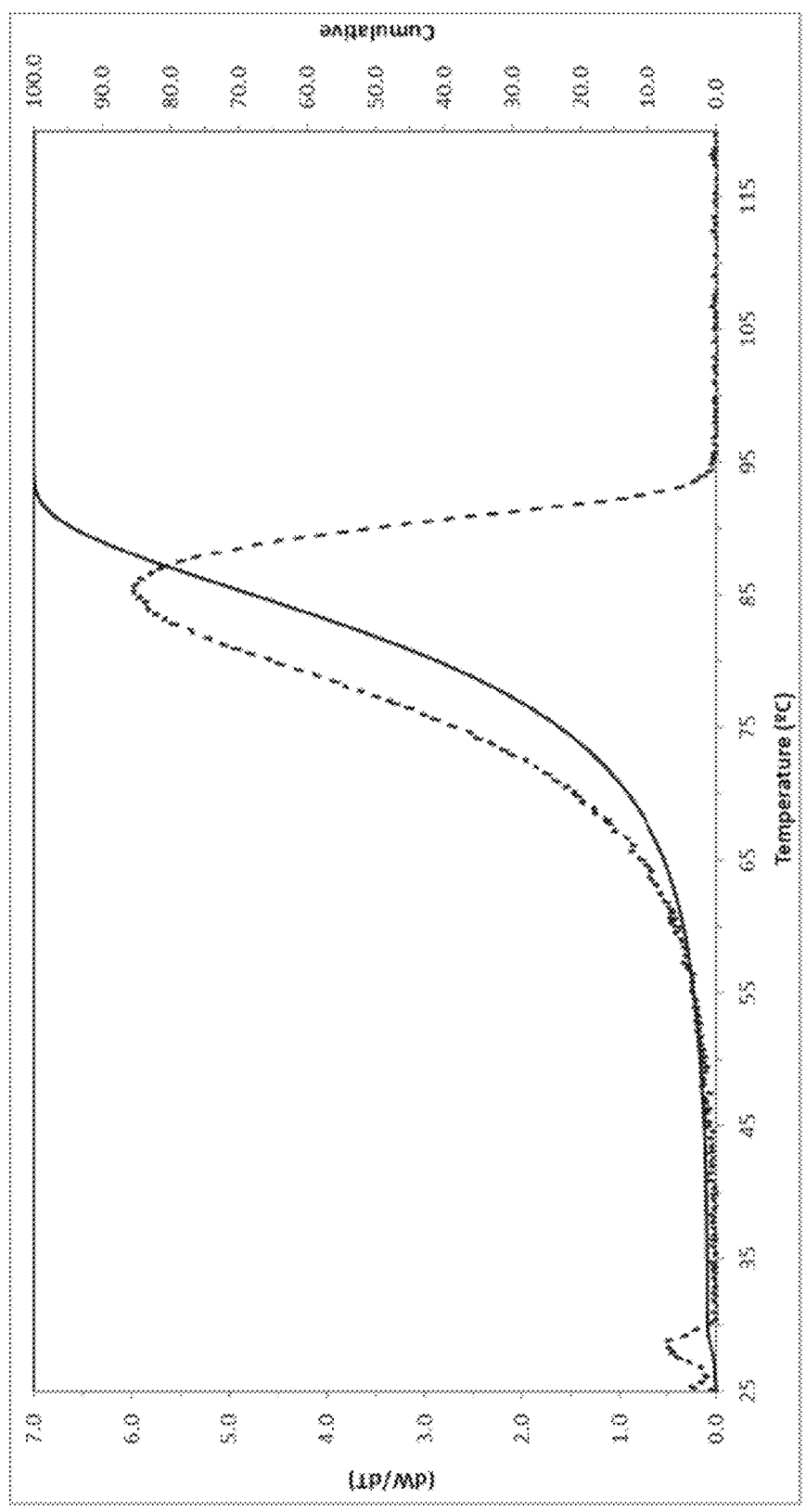
FIG. 3 presents a plot of the ATREF profile of the polymer of Example 3.
Figure 4:
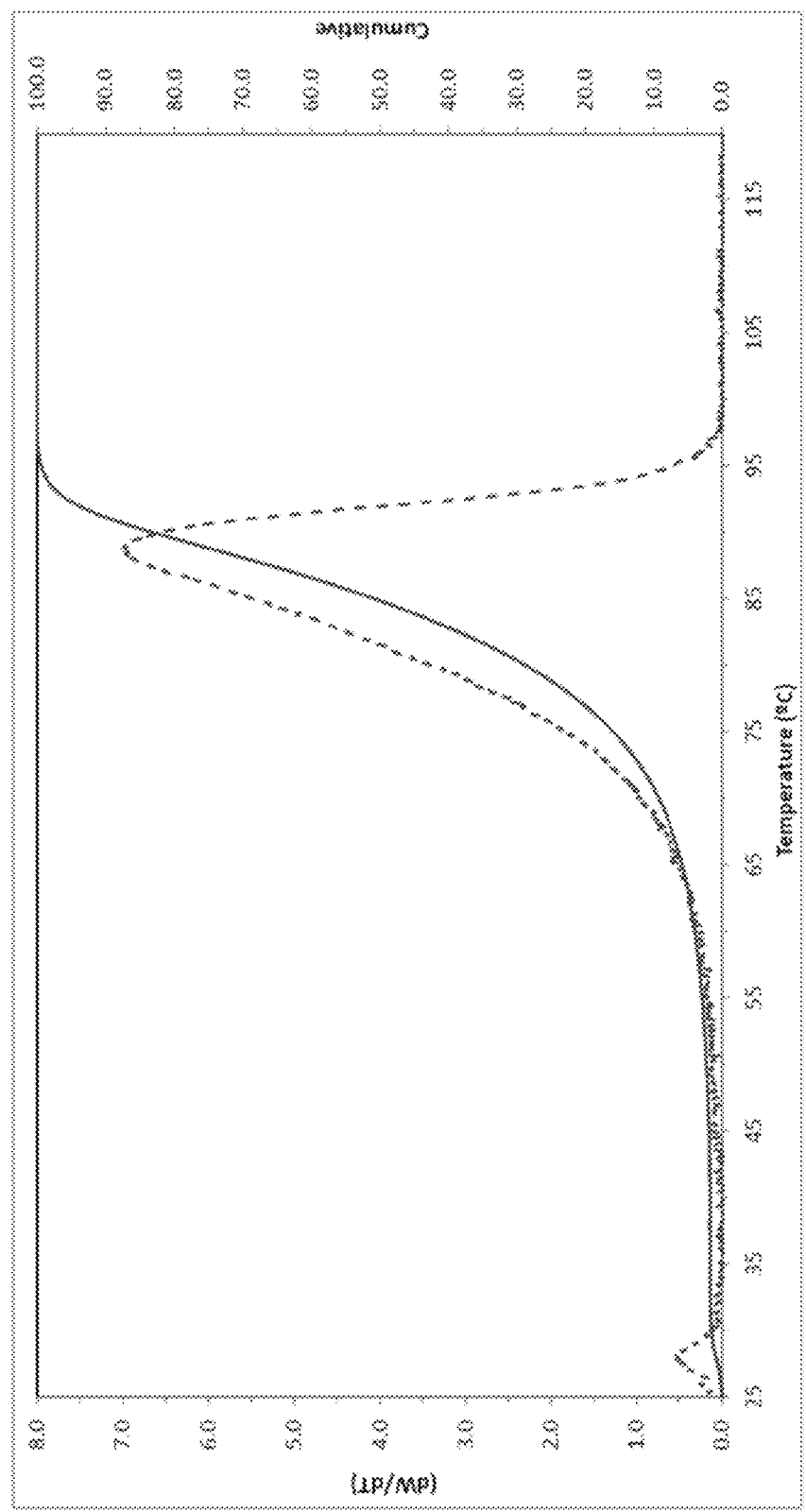
FIG. 4 presents a plot of the ATREF profile of the polymer of Example 4.
Figure 5:
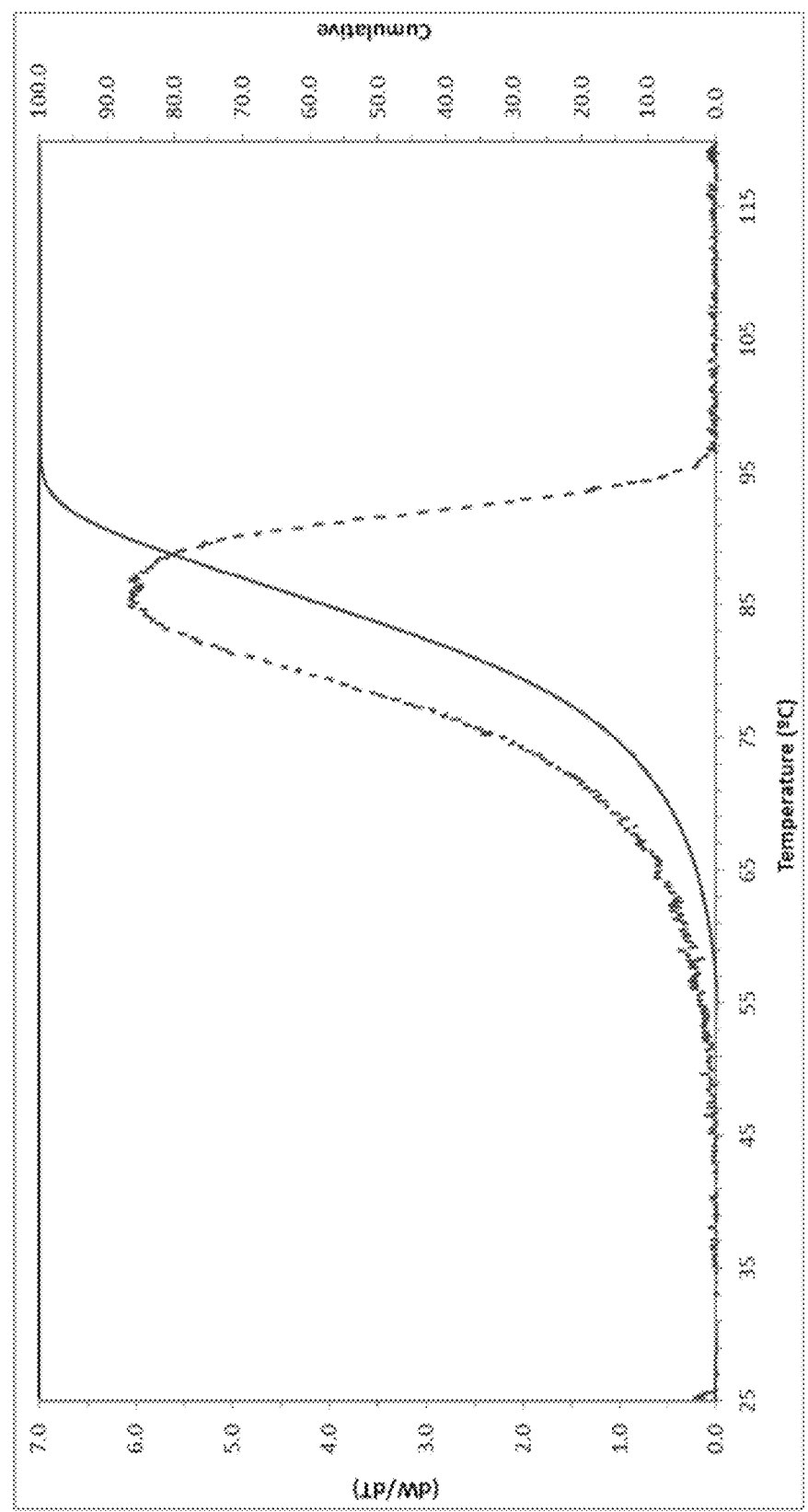
FIG. 5 presents a plot of the ATREF profile of the polymer of Example 5.
Figure 6:
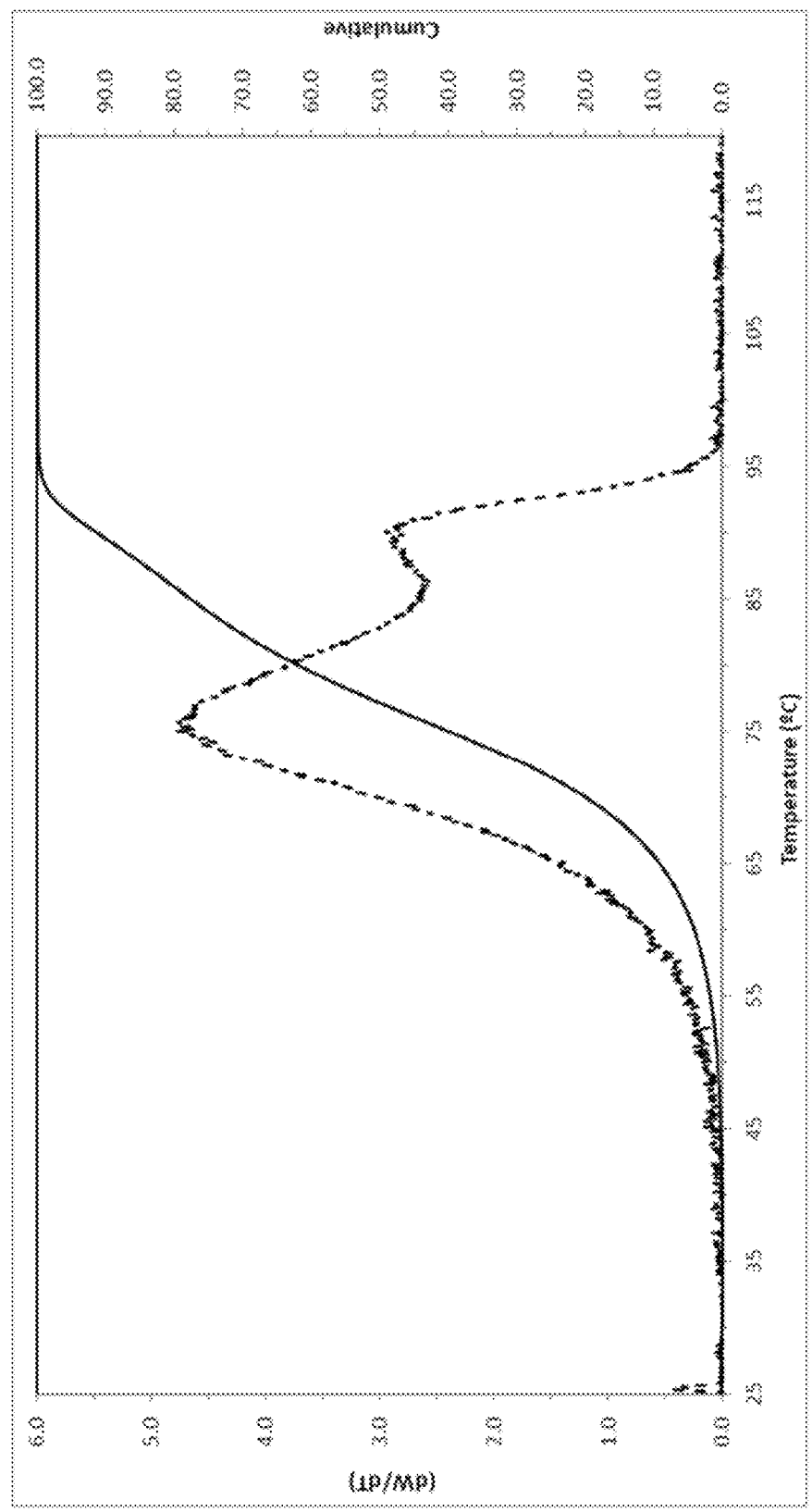
FIG. 6 presents a plot of the ATREF profile of the polymer of Example 6.
Figure 7:
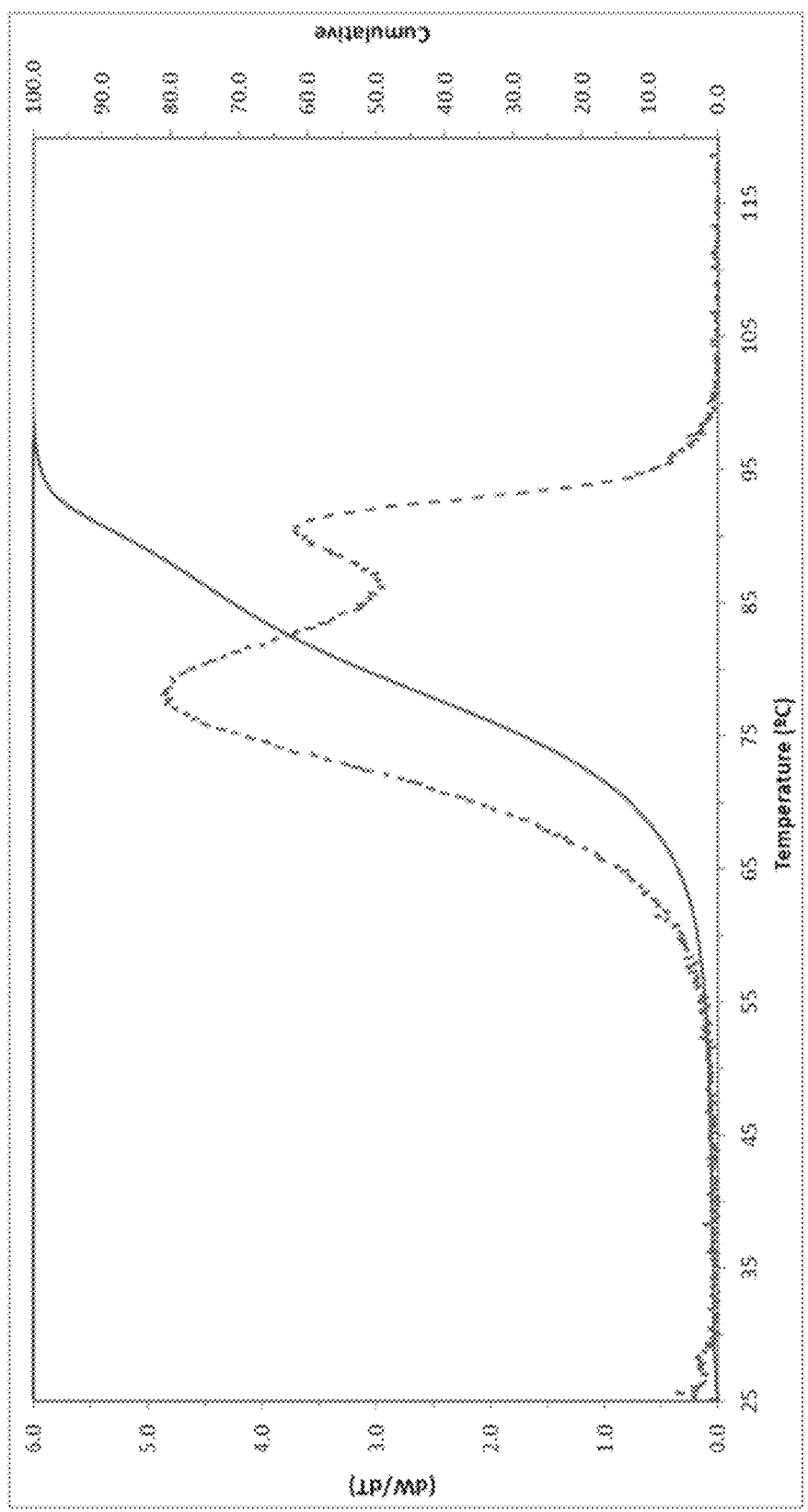
FIG. 7 presents a plot of the ATREF profile of the polymer of Example 7.
Figure 8:
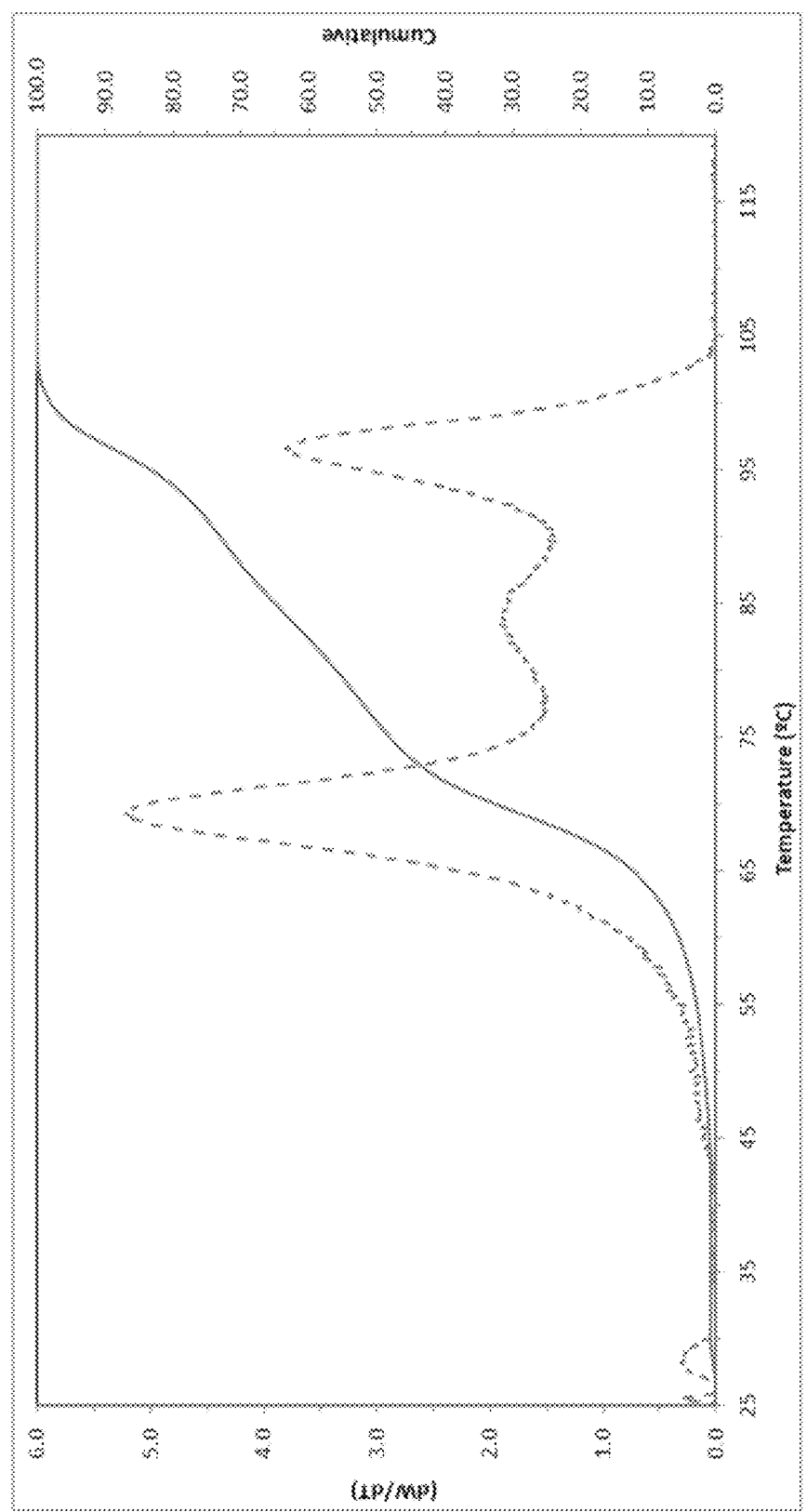
FIG. 8 presents a plot of the ATREF profile of the polymer of Example 8.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, and/or methods described herein are contemplated with or without explicit description of the particular combination. Additionally, unless explicitly recited otherwise, any aspect and/or feature disclosed herein can be combined to describe inventive features consistent with the present disclosure.

While compositions and methods are described herein in terms of "comprising" various components or steps, the compositions and methods also can "consist essentially of" or "consist of" the various components or steps, unless stated otherwise. For example, a catalyst composition consistent with aspects of the present invention can comprise; alternatively, can consist essentially of; or alternatively, can consist of; an unbridged metallocene compound, an activator, and a co-catalyst.

The terms "a," "an," "the," etc., are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers, and is inclusive of lower molecular weight polymers.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "chemically-treated solid oxide," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The "activator-support" of the present invention can be a chemically-treated solid oxide. The terms "support" and "activator-support" are not used to imply these components are inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands can include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the unbridged metallocene compound, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contact product" is used herein to describe compositions wherein the components are contacted together in any order, in any manner, and for any length of time, unless otherwise specified. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise combined in some other manner.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mw/Mn of an ethylene polymer consistent with aspects of this invention. By a disclosure that the ratio of Mw/Mn can be in a range from about 2 to about 4, the intent is to recite that the ratio of Mw/Mn can be any ratio in the range and, for example, can be equal to about 2, about 2.2, about 2.4, about 2.6, about 2.8, about 3, about 3.2, about 3.4, about 3.6, about 3.8, or about 4. Additionally, the ratio of Mw/Mn can be within any range from about 2 to about 4 (for example, from about 2.3 to about 3.6), and this also includes any combination of ranges between about 2 and about 4 (for example, the Mw/Mn ratio can be in a range from about 2 to about 2.7, or from about 3.3 to about 3.8). Further, in all instances, where "about" a particular value is disclosed, then that value itself is disclosed. Thus, the disclosure that the ratio of Mw/Mn can be from about 2 to about 4 also discloses a ratio of Mw/Mn from 2 to 4 (for example, from 2.3 to 3.6), and this also includes any combination of ranges between 2 and 4 (for example, the Mw/Mn ratio can be in a range from 2 to 2.7, or from 3.3 to 3.8). Likewise, all other ranges disclosed herein should be interpreted in a manner similar to these examples.

The term "about" means that amounts, sizes, formulations, parameters, and other quantities and characteristics are not and need not be exact, but can be approximate and/or larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

The present invention is directed generally to ethylene-based polymers having excellent impact and toughness properties, but with improved tear resistance and optical properties. Articles produced from these ethylene-based polymers, such as blown and cast films, can have an unexpected combination of both high tear strength and low haze.
Ethylene Polymers Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; alternatively, the olefin comonomer can comprise a $C_4$-$C_{10}$ α-olefin; alternatively, the olefin comonomer can comprise 1-butene, 1-hexene, 1-octene, or any combination thereof or alternatively, the comonomer can comprise 1-hexene. Typically, the amount of the comonomer, based on the total weight of monomer (ethylene) and comonomer, can be in a range from about 0.01 to about 20 wt. %, from about 0.1 to about 10 wt. %, from about 0.5 to about 15 wt. %, from about 0.5 to about 8 wt. %, or from about 1 to about 15 wt. %.

In one aspect, the ethylene polymer of this invention can comprise an ethylene/α-olefin copolymer, while in another aspect, the ethylene polymer can comprise an ethylene homopolymer, and in yet another aspect, the ethylene polymer of this invention can comprise an ethylene/α-olefin copolymer and an ethylene homopolymer. For example, the ethylene polymer can comprise an ethylene/1-butene copolymer, an ethylene/1-hexene copolymer, an ethylene/1-octene copolymer, or any combination thereof; alternatively, an ethylene/1-butene copolymer; alternatively, an ethylene/1-hexene copolymer; or alternatively, an ethylene/1-octene copolymer.

An illustrative and non-limiting example of an ethylene polymer (e.g., an ethylene copolymer) of the present invention can have a density in a range from about 0.908 to about 0.925 g/cm$^3$, a melt index in a range from about 0.5 to about 3 g/10 min, a ratio of Mw/Mn in a range from about 2 to about 4, a ratio of Mz/Mw in a range from about 1.6 to about 2.3, a CY-a parameter in a range from about 0.45 to about 0.6, and an ATREF profile characterized by a single peak at a peak ATREF temperature (temperature of the highest peak on the ATREF curve) in a range from about 76 to about 88° C., and by less than or equal to about 4.5 wt. % of the polymer eluting above a temperature of 91° C. In some aspects, less than or equal to about 4 wt. %, or less than or equal to about 3.5 wt. %, or less than or equal to about 3 wt. %, of the polymer elutes above a temperature of 91° C.

Another illustrative and non-limiting example of an ethylene polymer of the present invention can have a density in a range from about 0.908 to about 0.925 g/cm$^3$, a melt index in a range from about 0.5 to about 3 g/10 min, a ratio of Mw/Mn in a range from about 2 to about 4, a ratio of Mz/Mw in a range from about 1.6 to about 2.3, a CY-a parameter in a range from about 0.45 to about 0.6, an ATREF profile characterized by a single peak at a peak ATREF temperature in a range from about 76 to about 90° C., by less than or equal to about 12 wt. % of the polymer eluting above a temperature of 91° C., and by less than or equal to about 0.1 wt. % of the polymer eluting above a temperature of 100° C. In some aspects, less than or equal to about 11 wt. %, or less than or equal to about 10 wt. %, or less than or equal to about 4.5 wt. %, or less than or equal to about 3.5 wt. %, of the polymer elutes above a temperature of 91° C.

These illustrative and non-limiting examples of ethylene polymers consistent with the present invention also can have any of the polymer properties listed below and in any combination, unless indicated otherwise.

The densities of ethylene-based polymers disclosed herein often are less than or equal to about 0.925 g/cm$^3$, for example, less than or equal to about 0.922 g/cm$^3$. Yet, in particular aspects, the density can be in a range from about 0.908 to about 0.925 g/cm$^3$, from about 0.908 to about 0.922 g/cm$^3$, from about 0.908 to about 0.92 g/cm$^3$, from about 0.91 to about 0.925 g/cm$^3$, from about 0.91 to about 0.922 g/cm$^3$, or from about 0.91 to about 0.92 g/cm$^3$.

While not being limited thereto, ethylene polymers described herein often can have a melt index (MI) in a range from about 0.5 to about 3 g/10 min, from about 0.5 to about 2.5 g/10 min, or from about 0.5 to about 2.2 g/10 min. In further aspects, ethylene polymers described herein can have a melt index (MI) in a range from about 0.8 to about 2.5 g/10 min, from about 0.8 to about 2.2 g/10 min, from about 1 to about 2.5 g/10 min, from about 1 to about 2.2 g/10 min, or from about 1.6 to about 2.4 g/10 min.

Typically, the ethylene polymer can have a high load melt index (HLMI) in a range from about 10 to about 50 g/10 min; alternatively, from about 12 to about 45 g/10 min; alternatively, from about 12 to about 40 g/10 min; alternatively, from about 18 to about 45 g/10 min; alternatively, from about 15 to about 40 g/10 min; or alternatively, from about 25 to about 40 g/10 min.

The ratio of HLMI/MI of the ethylene polymer can fall in a range from about 10 to about 30, from about 10 to about 25, or from about 10 to about 20 in some aspects, while in other aspects, the ratio of HLMI/MI ranges from about 15 to about 30, from about 15 to about 25, from about 15 to about 22, or from about 15 to about 20.

In an aspect, ethylene polymers described herein can have a ratio of Mw/Mn, or the polydispersity index, in a range from about 2 to about 4, from about 2 to about 3.8, from about 2 to about 3.6, or from about 2 to about 3.5. In another aspect, ethylene polymers described herein can have a Mw/Mn in a range from about 2.2 to about 4, from about 2.2 to about 3.8, from about 2.2 to about 3.7, from about 2.3 to about 3.6, from about 2.3 to about 3.6, from about 2.4 to about 4, from about 2.4 to about 3.8, or from about 2.4 to about 3.7. Additionally or alternatively, the ethylene polymers can have a ratio of Mz/Mw in a range from about 1.6 to about 2.3, from about 1.7 to about 2.3, or from about 1.8 to about 2.3. In another aspect, ethylene polymers described herein can have a Mz/Mw in a range from about 1.6 to about 2.2, from about 1.7 to about 2.2, from about 1.8 to about 2.2, from about 1.7 to about 2.1, from about 1.8 to about 2.1, or from about 1.8 to about 2.

In an aspect, ethylene polymers described herein can have a weight-average molecular weight (Mw) in a range from about 80,000 to about 180,000 g/mol, from about 80,000 to about 160,000 g/mol, or from about 80,000 to about 120,000 g/mol. In another aspect, ethylene polymers described herein can have a Mw in a range from about 95,000 to about 175,000 g/mol, from about 95,000 to about 140,000 g/mol, from about 95,000 to about 115,000 g/mol, or from about 100,000 to about 110,000 g/mol. Additionally or alternatively, the ethylene polymers can have a number-average molecular weight (Mn) in a range from about 20,000 to about 60,000 g/mol, from about 20,000 to about 55,000 g/mol, or from about 20,000 to about 50,000 g/mol. In another aspect, the ethylene polymers can have a Mn in a range from about 25,000 to about 60,000 g/mol, from about 25,000 to about 55,000 g/mol, from about 25,000 to about 50,000 g/mol, or from about 25,000 to about 45,000 g/mol. Additionally or alternatively, the ethylene polymers can have a z-average molecular weight (Mz) in a range from about 150,000 to about 400,000, from about 150,000 to about 300,000 g/mol, or from about 175,000 to about 325,000 g/mol. In another aspect, the ethylene polymers can have a Mz in a range from about 175,000 to about 275,000 g/mol, from about 175,000 to about 250,000 g/mol, from about 175,000 to about 225,000, from about 185,000 to about 265,000 g/mol, or from about 185,000 to about 235,000 g/mol. Additionally or alternatively, the ethylene polymers can have a peak molecular weight (Mp) in a range from about 50,000 to about 200,000 g/mol, from about 60,000 to about 130,000 g/mol, from about 60,000 to about 115,000 g/mol, or from about 65,000 to about 120,000 g/mol. In another aspect, the ethylene polymers can have a Mp in a range from about 70,000 to about 130,000 g/mol, from about 70,000 to about 115,000 g/mol, or from about 75,000 to about 95,000 g/mol.

In accordance with certain aspects of this invention, the IB parameter from a molecular weight distribution curve (plot of dW/d(Log M) vs. Log M; normalized to an area equal to 1) can be an important characteristic of the ethylene polymers described herein. The IB parameter is often referred to as the integral breadth, and is defined as $1/[dW/d(Log M)]_{MAX}$, and is useful to describe a polymer having a relatively narrow molecular weight distribution with a small fraction of both high molecular weight and low molecular weight tails. Generally, the IB parameter of the ethylene polymers consistent with this invention can be in a range from about 0.9 to about 1.05, from about 0.92 to about 1.05, or from about 0.93 to about 1.05. In one aspect, the ethylene polymer can be characterized by an IB parameter in a range from about 0.91 to about 1.03, and in another aspect, from about 0.93 to about 1.03, and in yet another aspect, from about 0.95 to about 1.03.

Generally, ethylene polymers consistent with certain aspects of the invention can have a unimodal molecular weight distribution (as determined using gel permeation chromatography (GPC) or other related analytical technique). In a unimodal molecular weight distribution, there is a single identifiable peak.

While not limited thereto, ethylene polymers described herein can have a CY-a parameter of from about 0.45 to about 0.6, from about 0.45 to about 0.58, from about 0.48 to about 0.6, or from about 0.48 to about 0.58 in some aspects, while in other aspects, the CY-a parameter can range from about 0.5 to about 0.6, from about 0.52 to about 0.59, or from about 0.52 to about 0.58, and the like. Additionally or alternatively, these ethylene polymers can be characterized by a $\tau_\eta$ (relaxation time in sec) that often can range from about $4 \times 10^{-3}$ sec to about $2 \times 10^{-2}$ sec; alternatively, from about $5 \times 10^{-3}$ sec to about $1 \times 10^{-2}$ sec; or alternatively, from about $5 \times 10^{-3}$ sec to about $9 \times 10^{-3}$ sec. These rheological parameters are determined from viscosity data measured at 190° C. and using the Carreau-Yasuda (CY) empirical model as described herein.

In accordance with certain aspects of this invention, the ethylene polymers described herein can have a unique ATREF profile. For instance, the ethylene polymer can have a peak ATREF temperature (temperature of the highest peak on the ATREF curve in the 40-110° C. range) of from about 76 to about 90° C., or from about 76 to about 88° C. In some aspects, the peak ATREF temperature can be in a range from about 77 to about 89° C., from about 76 to about 87° C., from about 78 to about 87° C., or from about 79 to about 86° C. Moreover, only a small fraction of the disclosed ethylene polymers elutes above a temperature of 91° C.: less than or equal to about 12 wt. %, less than or equal to about 11 wt. %, or less than or equal to about 10 wt. % in one aspect, and less than or equal to about 4.5 wt. %, less than or equal to about 4 wt. %, less than or equal to about 3.5 wt. %, or less than or equal to about 3 wt. % in another aspect. Further, an even smaller fraction of the disclosed ethylene polymers elutes above a temperature of 100° C.: less than or equal to about 0.1 wt. %, less than or equal to about 0.09 wt. %, less than or equal to about 0.07 wt. %, or less than or equal to about 0.05 wt. %, and the like.

Additionally or alternatively, the ethylene polymer (e.g., the ethylene/α-olefin copolymer) can have an ATREF profile characterized by from about 0.05 to about 5 wt. % (or from about 0.1 to about 3 wt. %, or from about 0.3 to about 2 wt. %) of the polymer eluting below a temperature of 40° C.; by from about 14 to about 45 wt. % (or from about 16 to about 44 wt. %, or from about 22 to about 42 wt. %) of the polymer eluting between 40 and 76° C.; by from about 35 to about 53 wt. % (or from about 38 to about 52 wt. %, or from about 40 to about 51 wt. %) of the polymer eluting between 76 and 86° C.; and the remainder of the polymer (to reach 100 wt. %) eluting above a temperature of 86° C.

In an aspect, the ethylene polymer described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product. Additionally, the ethylene polymer can further contain any suitable additive, non-limiting examples of which include an antioxidant, an acid scavenger, an antiblock additive, a slip additive, a colorant, a filler, a polymer processing aid, a UV additive, and the like, as well as any combination thereof.

Moreover, the ethylene polymers can be produced with a metallocene catalyst system containing zirconium, discussed further below. Ziegler-Natta and hafnium metallocene based catalysts systems are not required. Therefore, the ethylene polymer can contain no measurable amount of titanium or hafnium (catalyst residue), i.e., less than 0.1 ppm by weight. In some aspects, the ethylene polymer can contain, independently, less than 0.08 ppm, less than 0.05 ppm, or less than 0.03 ppm, of titanium and hafnium.

Articles and Products

Articles of manufacture can be formed from, and/or can comprise, the ethylene polymers of this invention and, accordingly, are encompassed herein. For example, articles which can comprise ethylene polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of ethylene polymers described herein, and the article of manufacture can be or can comprise a blown film or a cast film.

In some aspects, the article produced from and/or comprising an ethylene polymer of this invention is a film product. For instance, the film can be a blown film or a cast film that is produced from and/or comprises any of the ethylene polymers disclosed herein. Such films also can contain one or more additives, non-limiting examples of which can include an antioxidant, an acid scavenger, an antiblock additive, a slip additive, a colorant, a filler, a processing aid, a UV inhibitor, and the like, as well as combinations thereof.

Also contemplated herein is a method for forming or preparing an article of manufacture comprising any ethylene polymer disclosed herein. For instance, a method can comprise (i) contacting a catalyst composition with ethylene and an olefin comonomer under polymerization conditions in a polymerization reactor system to produce an ethylene polymer, wherein the catalyst composition can comprise an unbridged metallocene compound, an activator (e.g., an activator-support comprising a solid oxide treated with an electron-withdrawing anion), and co-catalyst (e.g., an organoaluminum compound); and (ii) forming an article of manufacture comprising the ethylene polymer. The forming step can comprise blending, melt processing, extruding, molding, or thermoforming, and the like, including combinations thereof.

Also contemplated herein is a method for making a film (e.g., a blown film or a cast film) comprising any ethylene polymer disclosed herein. For instance, the method can comprise melt processing the ethylene polymer through a die to form the film. Suitably, the die can be configured based on the film to be produced, for example, an annular blown film die to produce a blown film, a slot or cast film die to produce a cast film, and so forth. Moreover, any suitable means of melt processing can be employed, although extrusion typically can be utilized. As above, additives can be combined with the polymer in the melt processing step (extrusion step), such as antioxidants, acid scavengers, antiblock additives, slip additives, colorants, fillers, processing aids, UV inhibitors, and the like, as well as combinations thereof.

Films disclosed herein, whether cast or blown, can be any thickness that is suitable for the particular end-use application, and often, the average film thickness can be in a range from about 0.25 to about 250 mils, or from about 0.5 to about 20 mils. For certain film applications, typical average thicknesses can be in a range from about 0.25 to about 8 mils, from about 0.5 to about 8 mils, from about 0.8 to about 5 mils, or from about 0.7 to about 2 mils.

In an aspect and unexpectedly, the blown films or cast films disclosed herein can have excellent tear resistance. Further, such films also can have very low haze, as compared to conventional blown films of generally the same nominal density. For instance, the tear resistance of the films described herein can be characterized by the MD (or TD) Elmendorf tear strength. Suitable ranges for the MD tear strength can include, but are not limited to, from about 200 to about 500 g/mil, from about 250 to about 500 g/mil, from about 300 to about 500 g/mil, from about 250 to about 400 g/mil, from about 300 to about 400 g/mil, or from about 275 to about 350 g/mil, and the like. Typical ranges for the TD tear strength can include, but are not limited to, from about 300 to about 800 g/mil, from about 300 to about 700 g/mil, from about 300 to about 625 g/mil, or from about 350 to about 650 g/mil, and the like.

While not being limited thereto, the blown film or cast film can have a ratio of MD Elmendorf tear strength to TD Elmendorf tear strength (MD:TD) in a range from about 0.3:1 to about 0.9:1, such as from about 0.4:1 to about 0.9:1, from about 0.5:1 to about 0.9:1, from about 0.45:1 to about 0.9:1, or from about 0.5:1 to about 0.85:1.

In some aspects, the film can have a dart impact greater than or equal to about 300 g/mil, greater than or equal to about 500 g/mil, greater than or equal to about 750 g/mil, greater than or equal to about 1000 g/mil, greater than or equal to about 1200 g/mil, or greater than or equal to about 1400 g/mil, and often can range up to about 1500-2000 g/mil or more. For many film applications, the upper limit on dart impact is not determined, so long as the dart impact exceeds a particular minimal value or threshold.

The film products encompassed herein also can be characterized by very good optical properties, such as low haze. As one of skill in the art would readily recognize, certain additives can adversely impact haze and other optical properties, for example, slip and antiblock additives. Nonetheless, the film products encompassed herein can have a haze (with or without additives) of less than or equal to about 10%, or less than or equal to about 8%, and often can have haze values ranging from about 2 to about 10%, from about 2 to about 8%, from about 2 to about 7%, or from about 2 to about 6%, and the like. Additionally or alternatively, the blown film or cast film can have a clarity (with or without additives) of at least about 70% in one aspect, at least about 75% in another aspect, and at least about 80% in yet another aspect.

Catalyst Systems and Polymerization Processes

In accordance with aspects of the present invention, the olefin polymer (e.g., the ethylene copolymer) can be produced using a metallocene-based catalyst system. In these aspects, the metallocene catalyst can comprise any suitable unbridged metallocene compound, or any unbridged metallocene compound disclosed herein. The catalyst system also can comprise any suitable activator or any activator disclosed herein, and optionally, any suitable co-catalyst or any co-catalyst disclosed herein.

Referring first to the metallocene component, the unbridged metallocene compound can comprise an unbridged zirconium or hafnium based metallocene compound containing two cyclopentadienyl groups, two indenyl groups, or a cyclopentadienyl and an indenyl group. In another aspect, the unbridged metallocene compound can comprise an unbridged zirconium based metallocene compound containing two cyclopentadienyl groups. In yet another aspect, the unbridged metallocene compound can comprise an unbridged zirconium based metallocene compound containing two indenyl groups.

Further, the cyclopentadienyl and/or indenyl groups can be substituted or unsubstituted. As an example, one (or both) of the cyclopentadienyl and/or indenyl groups of the unbridged metallocene compound can have a hydrocarbyl group as a substituent. Generally, the hydrocarbyl group which can be a substituent on a cyclopentadienyl group (or an indenyl group) can be a $C_1$ to $C_{36}$ hydrocarbyl group, including a $C_1$ to $C_{36}$ alkyl group, a $C_2$ to $C_{36}$ alkenyl group, a $C_4$ to $C_{36}$ cycloalkyl group, a $C_6$ to $C_{36}$ aryl group, or a $C_7$ to $C_{36}$ aralkyl group. For instance, each substituent independently can be a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group; alternatively, a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; alternatively, a $C_1$ to $C_{10}$ alkyl group, a $C_2$ to $C_{10}$ alkenyl group, a $C_4$ to $C_{10}$ cycloalkyl group, a $C_6$ to $C_{10}$ aryl group, or a $C_7$ to $C_{10}$ aralkyl group; or alternatively, a $C_1$ to $C_5$ alkyl group, a $C_2$ to $C_5$ alkenyl group, a $C_5$ to $C_8$ cycloalkyl group, a $C_6$ to $C_8$ aryl group, or a $C_7$ to $C_8$ aralkyl group.

Suitable alkyl groups that can be substituents on the cyclopentadienyl group (or the indenyl group) can include a methyl group, an ethyl group, a propyl group, a butyl group (e.g., t-Bu or n-Bu), a pentyl group, a hexyl group, a heptyl group, an octyl group, a nonyl group, or a decyl group, and the like.
Illustrative and non-limiting examples of unbridged metallocene compounds suitable for use in the metallocene-based catalyst system can include the following compounds (Ph=phenyl):
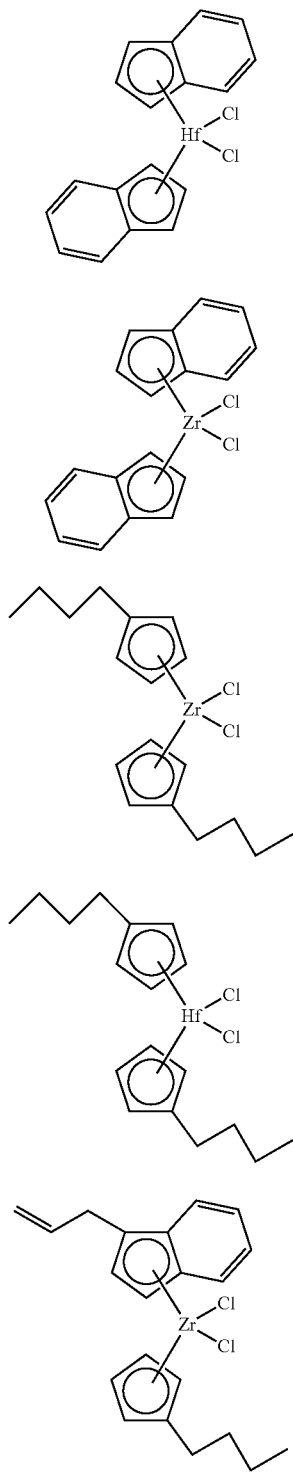
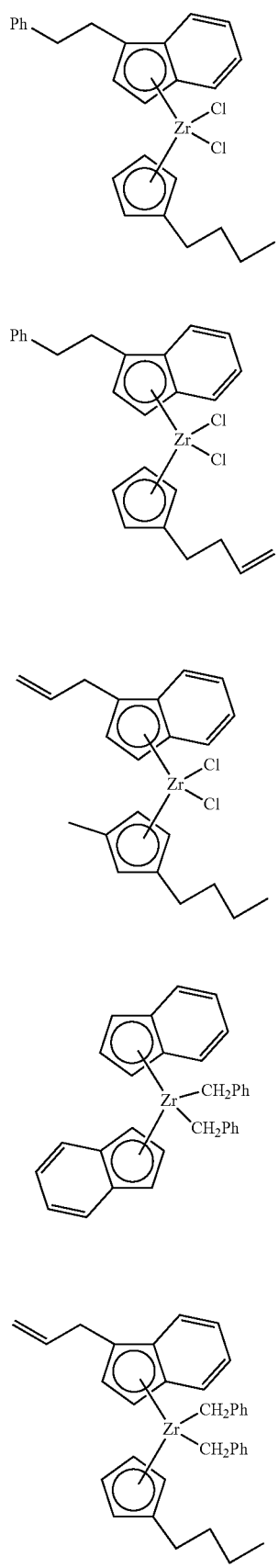

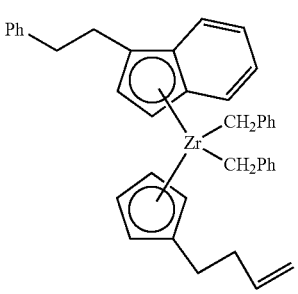
(11)

and the like, as well as combinations thereof.

The catalyst system is not limited solely to unbridged metallocene compounds such as described above. Other suitable unbridged metallocene compounds are disclosed in U.S. Pat. Nos. 7,199,073, 7,226,886, 7,312,283, and 7,619,047, which are incorporated herein by reference in their entirety.

Additionally, the catalyst system contains an activator. For example, the catalyst system can contain an activator-support, an aluminoxane compound, an organoboron or organoborate compound, an ionizing ionic compound, and the like, or any combination thereof. The catalyst system can contain one or more than one activator.

In one aspect, the catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. In another aspect, the catalyst system can comprise an aluminoxane compound. In yet another aspect, the catalyst system can comprise an organoboron or organoborate compound. In still another aspect, the catalyst system can comprise an ionizing ionic compound.

In other aspects, the catalyst system can comprise an activator-support, for example, an activator-support comprising a solid oxide treated with an electron-withdrawing anion. Examples of such materials are disclosed in, for instance, U.S. Pat. Nos. 7,294,599, 7,601,665, 7,884,163, 8,309,485, 8,623,973, and 9,023,959, which are incorporated herein by reference in their entirety. Thus, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, or phosphated silica-coated alumina, and the like, as well as any combination thereof. In some aspects, the activator-support can comprise a fluorided solid oxide and/or a sulfated solid oxide.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided or sulfated solid oxides) are well known to those of skill in the art.

The present invention can employ catalyst compositions containing an unbridged metallocene compound, an activator (one or more than one), and optionally, a co-catalyst. When present, the co-catalyst can include, but is not limited to, metal alkyl, or organometal, co-catalysts, with the metal encompassing boron, aluminum, zinc, and the like. Optionally, the catalyst systems provided herein can comprise a co-catalyst, or a combination of co-catalysts. For instance, alkyl boron, alkyl aluminum, and alkyl zinc compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include trimethylaluminum, triethylaluminum, tri-n-propylaluminum, tri-n-butylaluminum, tri-isobutylaluminum, tri-n-hexylaluminum, tri-n-octylaluminum, diisobutylaluminum hydride, diethylaluminum ethoxide, diethylaluminum chloride, and the like, as well as any combination thereof. Exemplary zinc compounds (e.g., organozinc compounds) that can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof. Accordingly, in an aspect of this invention, the catalyst composition can comprise an unbridged metallocene compound, an activator-support, and an organoaluminum compound.

In another aspect of the present invention, a catalyst composition is provided which comprises an unbridged metallocene compound, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, discussed herein, in the absence of these additional materials. For example, a catalyst composition of the present invention can consist essentially of an unbridged metallocene compound, an activator-support, and an organoaluminum compound, wherein no other materials are present in the catalyst composition which would increase/decrease the activity of the catalyst composition by more than about 10% from the catalyst activity of the catalyst composition in the absence of said materials.

Catalyst compositions of the present invention generally have a catalyst activity greater than about 250 grams of ethylene polymer (homopolymer and/or copolymer, as the context requires) per gram of activator-support per hour (abbreviated g/g/hr). In another aspect, the catalyst activity can be greater than about 350, greater than about 450, or greater than about 550 g/g/hr. Yet, in another aspect, the catalyst activity can be greater than about 700 g/g/hr, greater than about 1000 g/g/hr, or greater than about 2000 g/g/hr, and often as high as 5000-10,000 g/g/hr. Illustrative and non-limiting ranges for the catalyst activity include from about 500 to about 5000, from about 750 to about 4000, or from about 1000 to about 3500 g/g/hr, and the like. These activities are measured under slurry polymerization conditions, with a triisobutylaluminum co-catalyst, using isobutane as the diluent, at a polymerization temperature of about 95° C. and a reactor pressure of about 590 psig. Moreover, in some aspects, the activator-support can comprise sulfated alumina, fluorided silica-alumina, or fluorided silica-coated alumina, although not limited thereto.

This invention further encompasses methods of making these catalyst compositions, such as, for example, contacting the respective catalyst components in any order or sequence. In one aspect, for example, the catalyst composition can be produced by a process comprising contacting, in any order, the unbridged metallocene compound, the activator, and the co-catalyst.

Olefin polymers (e.g., ethylene polymers) can be produced from the disclosed catalyst systems using any suitable olefin polymerization process using various types of polymerization reactors, polymerization reactor systems, and polymerization reaction conditions. One such olefin polymerization process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise, as disclosed herein, an unbridged metallocene compound, an activator, and an optional co-catalyst. This invention also encompasses any olefin polymers (e.g., ethylene polymers) produced by any of the polymerization processes disclosed herein.

As used herein, a "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, or a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can be within a range from about 70° C. to about 100° C., or from about 75° C. to about 95° C.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Olefin monomers that can be employed with catalyst compositions and polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Density was determined in grams per cubic centimeter ($g/cm^3$) on a compression molded sample, cooled at 15° C. per minute, and conditioned for 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 μL was used. The integral calibration method was used to deduce molecular weights and molecular weight distributions using a Chevron Phillips Chemical Company's HDPE polyethylene resin, MARLEX® BHB5003, as the standard. The integral table of the broad standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve). The IB parameter was determined from the molecular weight distribution curve (plot of dW/d(Log M) vs. Log M; normalized to an area equal to 1), and is defined as $1/[dW/d(\text{Log } M)]_{MAX}$.

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero-shear viscosity—$\eta_0$, characteristic viscous relaxation time—$\tau_\eta$, and the breadth parameter—α (CY-a parameter). The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: |η*(ω)|=magnitude of complex shear viscosity;
$\eta_0$=zero shear viscosity;
$\tau_\eta$=viscous relaxation time (Tau(η));
a="breadth" parameter (CY-a parameter);
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

The ATREF procedure was as follows. Forty mg of the polymer sample and 20 mL of 1,2,4-trichlorobenzene (TCB) were sequentially charged into a vessel on a PolyChar TREF 200+ instrument. After dissolving the polymer, an aliquot (500 microliters) of the polymer solution was loaded on the column (stainless steel shots) at 150° C. and cooled at 0.5° C./min to 25° C. Then, the elution was begun with a 0.5 mL/min TCB flow rate and heating at 1° C./min up to 120° C., and analyzing with an IR detector. The peak ATREF temperature is the location, in temperature, of the highest point of the ATREF curve.

Dart impact strength (g/mil) can be measured in accordance with ASTM D1709 (method A). Machine direction (MD) and transverse direction (TD) Elmendorf tear strengths (g/mil) were measured on a Testing Machines Inc. tear tester (Model 83-11-00) in accordance with ASTM D1922. Film haze (%) was determined in accordance with ASTM D1003, and film clarity (%) was determined in accordance with ASTM 105.

Metals content, such as the amount of catalyst residue in the ethylene polymer or film, can be determined by ICP analysis on a PerkinElmer Optima 8300 instrument. Polymer samples can be ashed in a Thermolyne furnace with sulfuric acid overnight, followed by acid digestion in a HotBlock with HCl and $HNO_3$ (3:1 v:v).

Fluorided silica-coated alumina activator-supports (FSCA) were prepared as follows. Bohemite was obtained from W.R. Grace & Company under the designation "Alumina A" and having a surface area of 300 $m^2$/g, a pore volume of 1.3 mL/g, and an average particle size of 100 microns. The alumina was first calcined in dry air at about 600° C. for approximately 6 hours, cooled to ambient temperature, and then contacted with tetraethylorthosilicate in isopropanol to equal 25 wt. % $SiO_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina (FSCA) was collected and stored under dry nitrogen, and was used without exposure to the atmosphere.

Examples 1-4 were produced using the following polymerization procedure. The polymerization runs were conducted in a one-gallon (3.8-L) stainless steel reactor, and isobutane (2 L) was used in all runs. Under an isobutane purge, the organoaluminum compound (0.8 mL of 1M TIBA in heptanes), the activator-support (FSCA, 115 mg), and the metallocene compound (bis(n-butyl cyclopentadienyl) zirconium dichloride, 2 mg) were added in that order through a charge port while slowly venting isobutane vapor. The charge port was closed and isobutane was added. The contents of the reactor were stirred and heated to the desired run temperature of about 75° C., and ethylene and 1-hexene (60 to 140 g) were then introduced into the reactor (no hydrogen was used). Ethylene was fed on demand to maintain the target pressure of 260 psig pressure for the 30 minute length of the polymerization run. The reactor was maintained at the desired temperature throughout the run by an automated heating-cooling system. After venting of the reactor, purging, and cooling, the resulting polymer product was dried under reduced pressure.

Cast film samples at a 2-mil thickness (50 microns) were produced from Examples 1-7 on a laboratory-scale cast film line using typical linear low density polyethylene conditions (LLDPE) as follows: 152 mm die width, 0.508 mm die gap, 16 mm diameter single-screw extruder (L/D=24-27), 0.5 kg/hr output rate, and 204° C. barrel and die set temperatures. Cooling was accomplished with chill roll at about 23° C. These particular processing conditions were chosen because the cast film properties so obtained are typically representative of those obtained from larger, commercial scale film casting conditions.

Examples 1-8

Examples 1-4 were produced as described above. Comparative Examples 5-7 were commercially-available LLDPE (ethylene copolymer) resins from Chevron-Phillips Chemical Company LP, while Comparative Example 8 was a commercially-available LLDPE (ethylene copolymer) resin from The Dow Chemical Company.

Figure 9:
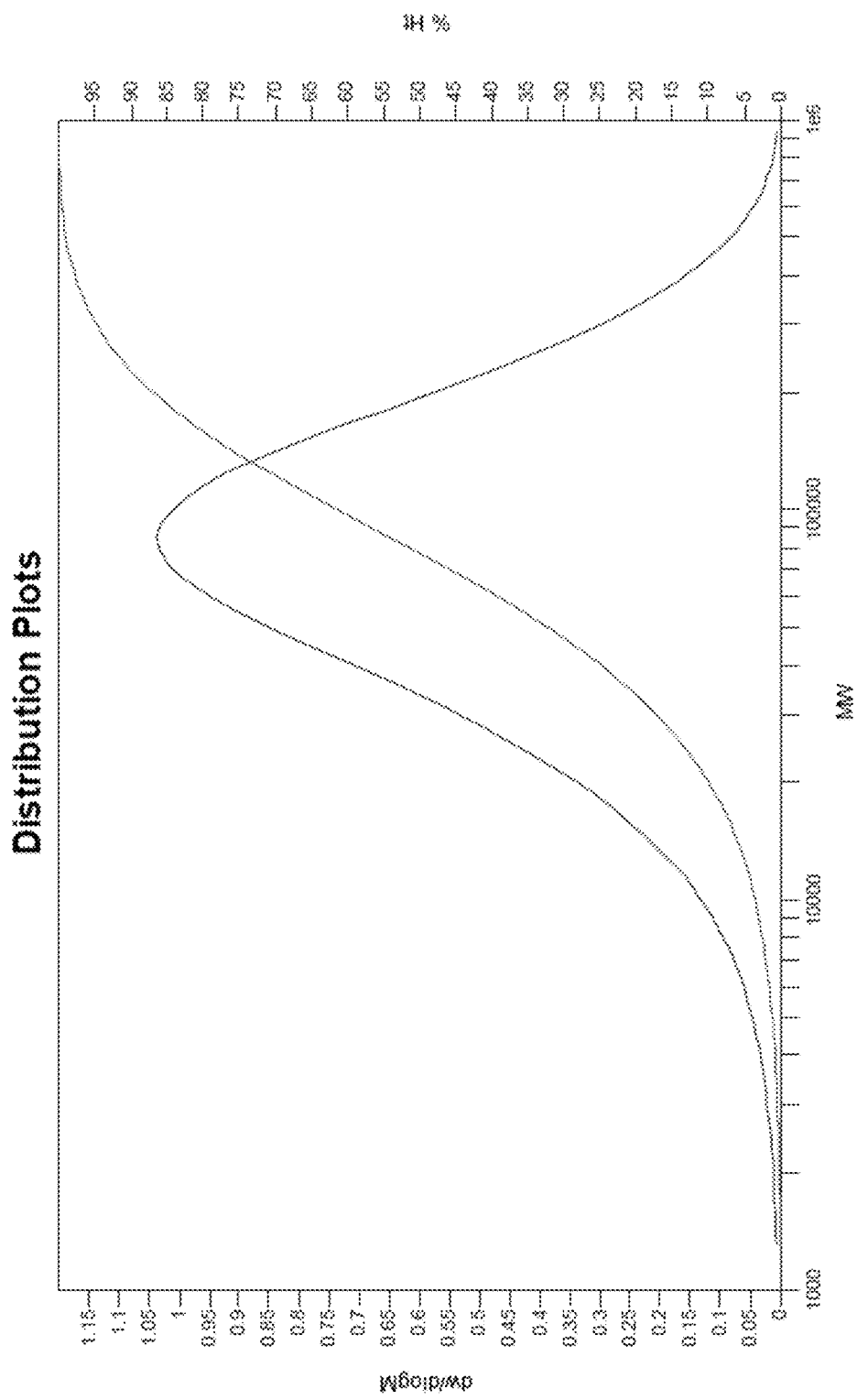
FIG. 9 presents a plot of the molecular weight distribution of the polymer of Example 1.

Table I summarizes various melt flow, rheology, molecular weight, and density properties of Examples 1-8. FIGS. 1-8 illustrate the ATREF profiles of the polymers of Examples 1-8, respectively, and certain information from the ATREF profiles is summarized in Table II. FIG. 9 illustrates the molecular weight distribution (amount of polymer versus the logarithm of molecular weight) for the polymer of Example 1. Table III summarizes tear resistance and optical properties of the cast films of Examples 1-7. Generally, the polymers of Examples 1-4 had densities in the 0.91-0.925 g/$cm^3$ range, melt index values in the 1.5-2.5 g/10 min range, ratios of Mw/Mn in the 2.5-4 range, ratios of Mz/Mw in the 1.8-2 range, and CY-a parameters in the 0.5-0.6 range. ATREF profiles of Examples 1-4 had single peaks at peak ATREF temperatures in the 80-90° C. range, with less than 12 wt. % of the polymer eluting above 91° C., and substantially none of the polymer eluting above 100° C.

Unexpectedly, Examples 1-4 had a single ATREF peak (between 40-110° C.), whereas Examples 6-8 had multiple peaks on the respective ATREF profiles. Example 5 had a single ATREF peak, however Example 5 had a much higher CY-a parameter and excessive film haze (~15%). As shown in Table III, the ethylene copolymers of inventive Examples 1-4 had the beneficial and surprising combination of excellent MD tear strength (greater than 300 g/mil) and low film haze (less than 11%, and often less than 6%). The comparative examples could provide either acceptable MD tear strength or acceptable film haze, but not both.

While not wishing to be bound by the following theory, it is believed that the combined polymer properties of density, molecular weight (e.g., narrow Mw/Mn and Mz/Mw), rheology (e.g., CY-a and relaxation time), and ATREF (e.g., a single peak and small amounts eluting at elevated temperatures) result in the beneficial and surprising combination of film properties: excellent MD tear strength (greater than 300 g/mil) and low haze (less than 11%, and often less than 6%).

TABLE I

Examples 1-8.

| Example | MI (g/10 min) | HLMI (g/10 min) | HLMI/MI | Density (g/cc) |
|---|---|---|---|---|
| 1 | 2.0 | 38 | 18.5 | 0.916 |
| 2 | 1.7 | 31 | 17.6 | 0.914 |
| 3 | 2.0 | 35 | 17.7 | 0.920 |
| 4 | 2.1 | 39 | 18.2 | 0.923 |
| 5 | 2.0 | 30 | 15.2 | 0.920 |
| 6 | 1.3 | 22 | 16.8 | 0.918 |
| 7 | 0.8 | 13 | 16.0 | 0.917 |
| 8 | 1.0 | — | — | 0.916 |

| Example | Mn/1000 (g/mol) | Mw/1000 (g/mol) | Mz/1000 (g/mol) | Mp/1000 (g/mol) | Mw/Mn | Mz/Mw | IB | $\tau_\eta$ (sec) | CY-a |
|---|---|---|---|---|---|---|---|---|---|
| 1 | 39.3 | 103 | 194 | 84 | 2.6 | 1.88 | 0.96 | 6.57E−03 | 0.54 |
| 2 | 32.6 | 108 | 208 | 93 | 3.3 | 1.94 | 1.01 | 8.14E−03 | 0.56 |
| 3 | 30.9 | 109 | 214 | 89 | 3.5 | 1.97 | 0.99 | 7.24E−03 | 0.55 |
| 4 | 29.0 | 107 | 210 | 87 | 3.7 | 1.96 | 1.02 | 7.11E−03 | 0.55 |
| 5 | 44.5 | 108 | 192 | 93 | 2.4 | 1.78 | 0.95 | 7.66E−03 | 0.69 |
| 6 | 54.3 | 119 | 200 | 103 | 2.2 | 1.68 | 0.89 | 1.06E−02 | 0.62 |
| 7 | 46.7 | 165 | 298 | 143 | 3.5 | 1.81 | 0.95 | 1.51E−02 | 0.56 |
| 8 | 46.8 | 127 | 250 | 96 | 2.7 | 1.98 | 1.14 | 2.78E−02 | 0.42 |

TABLE II

Examples 1-8 - ATREF Properties.

| Example | <40° C. (wt. %) | 40-76° C. (wt. %) | 76-86° C. (wt. %) | >86° C. (wt. %) | >91° C. (wt. %) | >100° C. (wt. %) |
|---|---|---|---|---|---|---|
| 1 | 1 | 41 | 44 | 14 | 1.9 | 0 |
| 2 | 2 | 39 | 49 | 10 | 1.5 | 0 |
| 3 | 1 | 25 | 48 | 25 | 2.5 | 0 |
| 4 | 2 | 16 | 39 | 43 | 10 | 0 |
| 5 | — | — | — | — | — | — |
| 6 | 1 | 36 | 42 | 21 | — | — |
| 7 | — | — | — | — | — | — |
| 8 | 1 | 49 | 17 | 33 | — | — |

| Example | 1st Peak Temp. (° C.) | 2nd Peak Temp. (° C.) | 3rd Peak Temp. (° C.) |
|---|---|---|---|
| 1 | 80.2 | — | — |
| 2 | 80.3 | — | — |
| 3 | 85.0 | — | — |
| 4 | 88.5 | — | — |
| 5 | — | — | — |
| 6 | 76 | 89 | — |
| 7 | — | — | — |
| 8 | 69 | 84 | 96 |

TABLE III

Examples 1-7 — Film Properties.

| Example | Tear MD (g/mil) | Tear TD (g/mil) | Tear Ratio MD/TD | Haze (%) | Clarity (%) |
|---|---|---|---|---|---|
| 1 | 318 | 605 | 0.52 | 5.2 | 81.8 |
| 2 | 307 | 369 | 0.83 | 3.0 | 82.1 |
| 3 | 303 | 484 | 0.63 | 5.5 | 84.2 |
| 4 | 323 | 539 | 0.60 | 10.7 | 83.4 |
| 5 | 313 | 503 | 0.62 | 15.1 | 81.5 |
| 6 | 209 | 445 | 0.47 | 4.8 | 83.6 |
| 7 | 145 | 480 | 0.30 | 5.4 | 85.1 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. An ethylene polymer characterized by a density in a range from about 0.908 to about 0.925 g/cm³, a melt index in a range from about 0.5 to about 3 g/10 min, a ratio of Mw/Mn in a range from about 2 to about 4, a ratio of Mz/Mw in a range from about 1.6 to about 2.3, a CY-a parameter in a range from about 0.45 to about 0.6, and an ATREF profile characterized by a single peak (between 40-110° C.) at a peak ATREF temperature in a range from about 76 to about 88° C., and by less than or equal to about 4.5 wt. % of the polymer eluting above a temperature of 91° C.

Aspect 2. The polymer defined in aspect 1, wherein less than or equal to about 4 wt. %, less than or equal to about 3.5 wt. %, less than or equal to about 3 wt. % of the polymer, etc., elutes above a temperature of 91° C.

Aspect 3. An ethylene polymer characterized by a density in a range from about 0.908 to about 0.925 g/cm³, a melt index in a range from about 0.5 to about 3 g/10 min, a ratio of Mw/Mn in a range from about 2 to about 4, a ratio of Mz/Mw in a range from about 1.6 to about 2.3, a CY-a parameter in a range from about 0.45 to about 0.6, and an ATREF profile characterized by a single peak (between 40-110° C.) at a peak ATREF temperature in a range from about 76 to about 90° C., by less than or equal to about 12 wt. % of the polymer eluting above a temperature of 91° C., and by less than or equal to about 0.1 wt. % of the polymer eluting above a temperature of 100° C.

Aspect 4. The polymer defined in aspect 3, wherein less than or equal to about 11 wt. %, less than or equal to about 10 wt. %, less than or equal to about 4.5 wt. %, less than or equal to about 3.5 wt. %, etc., elutes above a temperature of 91° C.

Aspect 5. The polymer defined in any one of the preceding aspects, wherein less than or equal to about 0.1 wt. %, less than or equal to about 0.09 wt. %, less than or equal to about 0.07 wt. %, less than or equal to about 0.05 wt. %, etc., elutes above a temperature of 100° C.

Aspect 6. The polymer defined in any one of the preceding aspects, wherein the ethylene polymer has a melt index (MI) in any range disclosed herein, e.g., from about 0.5 to about 2.5 g/10 min, from about 1 to about 2.5 g/10 min, from about 0.5 to about 2.2 g/10 min, from about 0.8 to about 2.2 g/10 min, etc.

Aspect 7. The polymer defined in any one of the preceding aspects, wherein the ethylene polymer has a high load melt index (HLMI) in any range disclosed herein, e.g., from about 10 to about 50 g/10 min, from about 12 to about 40 g/10 min, from about 18 to about 45 g/10 min, from about 15 to about 40 g/10 min, etc.

Aspect 8. The polymer defined in any one of the preceding aspects, wherein the ethylene polymer has a ratio of HLMI/MI in any range disclosed herein, e.g., from about 10 to about 30, from about 15 to about 30, from about 10 to about 25, from about 15 to about 25, etc.

Aspect 9. The polymer defined in any one of the preceding aspects, wherein the ethylene polymer has a density in any range disclosed herein, e.g., from about 0.908 to about 0.922 g/cm³, from about 0.908 to about 0.92 g/cm³, from about 0.91 to about 0.925 g/cm³, from about 0.91 to about 0.922 g/cm³, from about 0.91 to about 0.92 g/cm³, etc.

Aspect 10. The polymer defined in any one of the preceding aspects, wherein the ethylene polymer has a ratio of Mw/Mn in any range disclosed herein, e.g., from about 2.2 to about 4, from about 2.4 to about 4, from about 2 to about 3.8, from about 2.2 to about 3.8, from about 2.4 to about 3.8, from about 2 to about 3.6, from about 2.3 to about 3.6, etc.

Aspect 11. The polymer defined in any one of the preceding aspects, wherein the ethylene polymer has a ratio of Mz/Mw in any range disclosed herein, e.g., from about 1.7 to about 2.3, from about 1.8 to about 2.3, from about 1.6 to about 2.2, from about 1.7 to about 2.2, from about 1.7 to about 2.1, from about 1.8 to about 2.2, from about 1.8 to about 2.1, etc.

Aspect 12. The polymer defined in any one of the preceding aspects, wherein the ethylene polymer has a Mn in any range disclosed herein, e.g., from about 20,000 to about 60,000 g/mol, from about 20,000 to about 55,000 g/mol, from about 20,000 to about 50,000 g/mol, from about 25,000 to about 60,000 g/mol, from about 25,000 to about 55,000 g/mol, from about 25,000 to about 50,000 g/mol, from about 25,000 to about 45,000 g/mol, etc.

Aspect 13. The polymer defined in any one of the preceding aspects, wherein the ethylene polymer has a Mw in any range disclosed herein, e.g., from about 80,000 to about 180,000 g/mol, from about 80,000 to about 160,000 g/mol, from about 95,000 to about 175,000 g/mol, from about 95,000 to about 140,000 g/mol, etc.

Aspect 14. The polymer defined in any one of the preceding aspects, wherein the ethylene polymer has a Mp in any range disclosed herein, e.g., from about 60,000 to about 130,000 g/mol, from about 70,000 to about 130,000 g/mol, from about 60,000 to about 115,000 g/mol, from about 70,000 to about 115,000 g/mol, from about 75,000 to about 95,000 g/mol, etc.

Aspect 15. The polymer defined in any one of the preceding aspects, wherein the ethylene polymer has a Mz in any range disclosed herein, e.g., from about 150,000 to about 300,000 g/mol, from about 175,000 to about 275,000 g/mol, from about 175,000 to about 250,000 g/mol, from about 185,000 to about 265,000 g/mol, from about 185,000 to about 235,000 g/mol, etc.

Aspect 16. The polymer defined in any one of the preceding aspects, wherein the ethylene polymer has an IB parameter in any range disclosed herein, e.g., from about 0.9 to about 1.05, from about 0.92 to about 1.05, from about 0.93 to about 1.03, from about 0.95 to about 1.03, etc.

Aspect 17. The polymer defined in any one of the preceding aspects, wherein the ethylene polymer has a CY-a parameter in any range disclosed herein, e.g., from about 0.45 to about 0.58, from about 0.48 to about 0.6, from about 0.48 to about 0.58, from about 0.5 to about 0.6, from about 0.52 to about 0.59, etc.

Aspect 18. The polymer defined in any one of the preceding aspects, wherein the ethylene polymer has a $\tau_\eta$ (relaxation time) in any range disclosed herein, e.g., from about $4 \times 10^{-3}$ sec to about $2 \times 10^{-2}$ sec, from about $5 \times 10^{-3}$ sec to about $1 \times 10^{-2}$ sec, from about $5 \times 10^{-3}$ sec to about $9 \times 10^{-3}$ sec, etc.

Aspect 19. The polymer defined in any one of the preceding aspects, wherein the peak ATREF temperature is in a range from about 77 to about 89° C., from about 76 to about 88° C., from about 78 to about 87° C., from about 79 to about 86° C., etc.

Aspect 20. The polymer defined in any one of the preceding aspects, wherein the ethylene polymer has an ATREF profile characterized by from about 0.05 to about 5 wt. % (or from about 0.1 to about 3 wt. %, or from about 0.3 to about 2 wt. %) of the polymer eluting below a temperature of 40° C., by from about 14 to about 45 wt. % (or from about 16 to about 44 wt. %, or from about 22 to about 42 wt. %) of the polymer eluting between 40 and 76° C., by from about 35 to about 53 wt. % (or from about 38 to about 52 wt. %, or from about 40 to about 51 wt. %) of the polymer eluting between 76 and 86° C., and the remainder of the polymer (to reach 100 wt. %) eluting above a temperature of 86° C.

Aspect 21. The polymer defined in any one of the preceding aspects, wherein the ethylene polymer has a unimodal molecular weight distribution (single peak).

Aspect 22. The polymer defined in any one of the preceding aspects, wherein the ethylene polymer is a single reactor product, e.g., not a post-reactor blend of two polymers, for instance, having different molecular weight characteristics.

Aspect 23. The polymer defined in any one of the preceding aspects, wherein the ethylene polymer comprises an ethylene/α-olefin copolymer.

Aspect 24. The polymer defined in any one of the preceding aspects, wherein the ethylene polymer comprises an ethylene/1-butene copolymer, an ethylene/1-hexene copolymer, and/or an ethylene/1-octene copolymer.

Aspect 25. The polymer defined in any one of the preceding aspects, wherein the ethylene polymer comprises an ethylene/1-hexene copolymer.

Aspect 26. The polymer defined in any one of the preceding aspects, wherein the ethylene polymer contains, independently, less than 0.1 ppm (by weight), less than 0.08 ppm, less than 0.05 ppm, less than 0.03 ppm, etc., of hafnium and titanium.

Aspect 27. The polymer defined in any one of the preceding aspects, wherein the polymer further comprises any additive disclosed herein, e.g., an antioxidant, an acid scavenger, an antiblock additive, a slip additive, a colorant, a filler, a polymer processing aid, a UV additive, etc., or combinations thereof.

Aspect 28. An article of manufacture comprising (or produced from) the ethylene polymer defined in any one of aspects 1-27.

Aspect 29. An article of manufacture comprising (or produced from) the ethylene polymer defined in any one of aspects 1-27, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Aspect 30. A film comprising (or produced from) the ethylene polymer defined in any one of aspects 1-27.

Aspect 31. The film defined in aspect 30, wherein the film has a haze (with or without additives) in any range disclosed herein, e.g., less than or equal to about 10%, less than or equal to about 8%, from about 2 to about 10%, from about 2 to about 8%, from about 2 to about 7%, etc.

Aspect 32. The film defined in aspect 30 or 31, wherein the film has a MD Elmendorf tear strength in any range disclosed herein, e.g., from about 200 to about 500 g/mil, from about 250 to about 500 g/mil, from about 300 to about 500 g/mil, from about 250 to about 400 g/mil, from about 275 to about 350 g/mil, etc.

Aspect 33. The film defined in any one of aspects 30-32, wherein the film has a TD Elmendorf tear strength in any range disclosed herein, e.g., from about 300 to about 800 g/mil, from about 300 to about 700 g/mil, from about 300 to about 625 g/mil, from about 350 to about 650 g/mil, etc.

Aspect 34. The film defined in any one of aspects 30-33, wherein the film has a clarity (with or without additives) in any range disclosed herein, e.g., at least about 70%, at least about 75%, at least about 80%, etc.

Aspect 35. The film defined in any one of aspects 30-34, wherein the film has an average thickness in any range disclosed herein, e.g., from about 0.5 to about 20 mils, from about 0.5 to about 8 mils, from about 0.8 to about 5 mils, from about 0.7 to about 2 mils, etc.

Aspect 36. The film defined in any one of aspects 30-35, wherein the film has a dart impact strength in any range disclosed herein, e.g., greater than or equal to about 300 g/mil, greater than or equal to about 500 g/mil, greater than or equal to about 1000 g/mil, greater than or equal to about 1400 g/mil, etc.

Aspect 37. The film defined in any one of aspects 30-36, wherein the film has a ratio of MD Elmendorf tear strength to TD Elmendorf tear strength (MD:TD) in any range disclosed herein, e.g., from about 0.3:1 to about 0.9:1, from about 0.4:1 to about 0.9:1, from about 0.5:1 to about 0.9:1, from about 0.5:1 to about 0.85:1, etc.

Aspect 38. The film defined in any one of aspects 30-37, wherein the film is a blown film.

Aspect 39. The film defined in any one of aspects 30-37, wherein the film is a cast film.

Aspect 40. A catalyst composition comprising any unbridged metallocene compound disclosed herein, any activator disclosed herein, and optionally, any co-catalyst disclosed herein.

Aspect 41. The composition defined in aspect 40, wherein the unbridged metallocene compound comprises an unbridged zirconium or hafnium based metallocene compound containing two cyclopentadienyl groups, two indenyl groups, or a cyclopentadienyl and an indenyl group.

Aspect 42. The composition defined in aspect 40, wherein the unbridged metallocene compound comprises an unbridged zirconium based metallocene compound containing two cyclopentadienyl groups.

Aspect 43. The composition defined in aspect 40, wherein the unbridged metallocene compound comprises an unbridged zirconium based metallocene compound containing two indenyl groups.

Aspect 44. The composition defined in any one of aspects 41-43, wherein one (or both) of the cyclopentadienyl and/or indenyl groups is alkyl-substituted.

Aspect 45. The composition defined in any one of aspects 40-44, wherein the activator comprises an activator-support, an aluminoxane compound, an organoboron or organoborate compound, an ionizing ionic compound, or any combination thereof.

Aspect 46. The composition defined in any one of aspects 40-44, wherein the activator comprises an aluminoxane compound.

Aspect 47. The composition defined in any one of aspects 40-44, wherein the activator comprises an organoboron or organoborate compound.

Aspect 48. The composition defined in any one of aspects 40-44, wherein the activator comprises an ionizing ionic compound.

Aspect 49. The composition defined in any one of aspects 40-44, wherein the activator comprises an activator-support, the activator-support comprising any solid oxide treated with any electron-withdrawing anion disclosed herein.

Aspect 50. The composition defined in any one of aspects 40-44, wherein the activator comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, phosphated silica-coated alumina, or any combination thereof.

Aspect 51. The composition defined in any one of aspects 40-44, wherein the activator comprises a fluorided solid oxide and/or a sulfated solid oxide.

Aspect 52. The composition defined in any one of aspects 40-51, wherein the catalyst composition comprises a co-catalyst, e.g., any co-catalyst disclosed herein.

Aspect 53. The composition defined in any one of aspects 40-52, wherein the co-catalyst comprises any organoaluminum compound disclosed herein.

Aspect 54. The composition defined in aspect 53, wherein the organoaluminum compound comprises trimethylaluminum, triethylaluminum, triisobutylaluminum, or a combination thereof.

Aspect 55. The composition defined in any one of aspects 49-54, wherein the catalyst composition comprises an unbridged metallocene compound, a solid oxide treated with an electron-withdrawing anion, and an organoaluminum compound.

Aspect 56. The composition defined in any one of aspects 49-55, wherein the catalyst composition is substantially free of aluminoxane compounds, organoboron or organoborate compounds, ionizing ionic compounds, or combinations thereof.

Aspect 57. The composition defined in any one of aspects 40-56, wherein the catalyst composition is produced by a process comprising contacting, the unbridged metallocene compound, the activator, and the co-catalyst.

Aspect 58. An olefin polymerization process, the process comprising contacting the catalyst composition defined in any one of aspects 40-57 with an olefin monomer and an optional olefin comonomer in a polymerization reactor system under polymerization conditions to produce an olefin polymer.

Aspect 59. The process defined in aspect 58, wherein the olefin monomer comprises any olefin monomer disclosed herein, e.g., any $C_2$-$C_{20}$ olefin.

Aspect 60. The process defined in aspect 58 or 59, wherein the olefin monomer and the optional olefin comonomer independently comprise a $C_2$-$C_{20}$ alpha-olefin.

Aspect 61. The process defined in any one of aspects 58-60, wherein the olefin monomer comprises ethylene.

Aspect 62. The process defined in any one of aspects 58-61, wherein the catalyst composition is contacted with ethylene and an olefin comonomer comprising a $C_3$-$C_{10}$ alpha-olefin.

Aspect 63. The process defined in any one of aspects 58-62, wherein the catalyst composition is contacted with ethylene and an olefin comonomer comprising 1-butene, 1-hexene, 1-octene, or a mixture thereof.

Aspect 64. The process defined in any one of aspects 58-63, wherein the polymerization reactor system comprises a batch reactor, a slurry reactor, a gas-phase reactor, a solution reactor, a high pressure reactor, a tubular reactor, an autoclave reactor, or a combination thereof.

Aspect 65. The process defined in any one of aspects 58-64, wherein the polymerization reactor system comprises a slurry reactor, a gas-phase reactor, a solution reactor, or a combination thereof.

Aspect 66. The process defined in any one of aspects 58-65, wherein the polymerization reactor system comprises a loop slurry reactor.

Aspect 67. The process defined in any one of aspects 58-66, wherein the polymerization reactor system comprises a single reactor.

Aspect 68. The process defined in any one of aspects 58-66, wherein the polymerization reactor system comprises 2 reactors.

Aspect 69. The process defined in any one of aspects 58-66, wherein the polymerization reactor system comprises more than 2 reactors.

Aspect 70. The process defined in any one of aspects 58-69, wherein the olefin polymer comprises any olefin polymer disclosed herein.

Aspect 71. The process defined in any one of aspects 58-70, wherein the olefin polymer comprises an ethylene/1-butene copolymer, an ethylene/1-hexene copolymer, and/or an ethylene/1-octene copolymer.

Aspect 72. The process defined in any one of aspects 58-71, wherein the olefin polymer comprises an ethylene/1-hexene copolymer.

Aspect 73. The process defined in any one of aspects 58-72, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 74. The process defined in any one of aspects 58-73, wherein the polymerization conditions are substantially constant, e.g., for a particular polymer grade.

Aspect 75. The process defined in any one of aspects 58-74, wherein no hydrogen is added to the polymerization reactor system.

Aspect 76. The process defined in any one of aspects 58-74, wherein hydrogen is added to the polymerization reactor system.

Aspect 77. The process defined in any one of aspects 58-76, wherein the olefin polymer produced is defined in any one of aspects 1-27.

Aspect 78. An olefin polymer produced by the olefin polymerization process defined in any one of aspects 58-76.

Aspect 79. An ethylene polymer defined in any one of aspects 1-27 produced by the process defined in any one of aspects 58-76.

Aspect 80. An article (e.g., a blown film or a cast film) comprising the polymer defined in any one of aspects 78-79.

We claim:

1. A film comprising an ethylene polymer, wherein the film has:
    a haze in a range from about 2 to about 10%; and
    a MD Elmendorf tear strength in a range from about 200 to about 500 g/mil; and wherein the ethylene polymer has:
    a density in a range from about 0.908 to about 0.925 g/cm$^3$;
    a melt index in a range from about 0.5 to about 3 g/10 min;
    a ratio of Mw/Mn in a range from about 2 to about 4;
    a ratio of Mz/Mw in a range from about 1.6 to about 2.3;
    a CY-a parameter in a range from about 0.45 to about 0.6; and
    an ATREF profile characterized by a single peak at a peak ATREF temperature in a range from about 76 to about 88° C., and by less than or equal to about 4.5 wt % of the polymer eluting above a temperature of 91° C.

2. The film of claim 1, wherein:
the peak ATREF temperature is in a range from about 79 to about 86° C.; and
less than or equal to about 3.5 wt % of the polymer elutes above a temperature of 91° C.

3. The film of claim 1, wherein:
the haze is in a range from about 2 to about 8%; and
the MD Elmendorf tear strength is in a range from about 250 to about 400 g/mil.

4. The film of claim 1, wherein:
the ethylene polymer has a unimodal molecular weight distribution; and
the ethylene polymer comprises an ethylene/1-butene copolymer, an ethylene/1-hexene copolymer, an ethylene/1-octene copolymer, or a combination thereof.

5. The film of claim 4, wherein the film is a blown film having an average thickness in a range from about 0.8 to about 5 mils.

6. The film of claim 4, wherein:
the density is in a range from about 0.91 to about 0.922 g/cm$^3$;
the melt index is in a range from about 1 to about 2.5 g/10 min;
the ratio of Mw/Mn is in a range from about 2.2 to about 3.8;
the ratio of Mz/Mw is in a range from about 1.7 to about 2.2; and
the CY-a parameter is in a range from about 0.5 to about 0.6.

7. The film of claim 6, wherein the film is a cast film having an average thickness in a range from about 0.5 to about 8 mils.

8. The film of claim 4, wherein the film has:
a ratio of MD Elmendorf tear strength to TD Elmendorf tear strength (MD:TD) in a range from about 0.5:1 to about 0.9:1; and
a dart impact strength of greater than or equal to about 500 g/mil.

9. The film of claim 1, wherein the ethylene polymer has:
a Mn in a range from about 25,000 to about 55,000 g/mol; and
a high load melt index (HLMI) in a range from about 18 to about 45 g/10 min.

10. The film of claim 1, wherein the ethylene polymer has:
a Mz in a range from about 175,000 to about 275,000 g/mol; and
an IB parameter in a range from about 0.9 to about 1.05.

11. The film of claim 1, wherein:
the haze is in a range from about 2 to about 7%; and
the MD Elmendorf tear strength is in a range from about 300 to about 400 g/mil.

12. An ethylene polymer having:
a density in a range from about 0.908 to about 0.925 g/cm$^3$;
a melt index in a range from about 0.5 to about 3 g/10 min;
a ratio of Mw/Mn in a range from about 2 to about 4;
a ratio of Mz/Mw in a range from about 1.6 to about 2.3;
a CY-a parameter in a range from about 0.45 to about 0.6; and
an ATREF profile characterized by a single peak at a peak ATREF temperature in a range from about 76 to about 88° C., and by less than or equal to about 4.5 wt % of the polymer eluting above a temperature of 91° C.

13. The polymer of claim 12, wherein the ethylene polymer has:
a Mw in a range from about 80,000 to about 180,000 g/mol; and
a relaxation time ($\tau_\eta$) in a range from about $4 \times 10^{-3}$ sec to about $2 \times 10^{-2}$ sec.

14. An article of manufacture comprising the ethylene polymer of claim 13.

15. The polymer of claim 12, wherein:
the density is in a range from about 0.91 to about 0.922 g/cm$^3$;
the melt index is in a range from about 1 to about 2.5 g/10 min;
the ratio of Mw/Mn is in a range from about 2.2 to about 3.8;
the ratio of Mz/Mw is in a range from about 1.7 to about 2.2;
the CY-a parameter is in a range from about 0.52 to about 0.59;
the peak ATREF temperature is in a range from about 79 to about 86° C.; and
less than or equal to about 3.5 wt % of the polymer elutes above a temperature of 91° C.

16. The polymer of claim 12, wherein the ATREF profile is further characterized by from about 0.05 to about 5 wt % of the polymer eluting below a temperature of 40° C., from about 14 to about 45 wt % of the polymer eluting between 40 and 76° C., from about 35 to about 53 wt % of the polymer eluting between 76 and 86° C., and the remainder of the polymer eluting above a temperature of 86° C.

17. An ethylene polymer having:
a density in a range from about 0.908 to about 0.925 g/cm$^3$;
a melt index in a range from about 0.5 to about 3 g/10 min;
a ratio of Mw/Mn in a range from about 2 to about 4;
a ratio of Mz/Mw in a range from about 1.6 to about 2.3;
a CY-a parameter in a range from about 0.45 to about 0.6; and
an ATREF profile characterized by a single peak at a peak ATREF temperature in a range from about 76 to about 90° C., by less than or equal to about 12 wt % of the polymer eluting above a temperature of 91° C., and by less than or equal to about 0.1 wt % of the polymer eluting above a temperature of 100° C.

18. An article of manufacture comprising the ethylene polymer of claim 17.

19. The polymer of claim 17, wherein:
the peak ATREF temperature is in a range from about 77 to about 89° C.;
less than or equal to about 11 wt % of the polymer elutes above a temperature of 91° C.; and
less than or equal to about 0.07 wt % of the polymer elutes above a temperature of 100° C.

20. The polymer of claim 17, wherein the ethylene polymer:
has a unimodal molecular weight distribution; and
contains less than 0.1 ppm, independently, of hafnium and titanium.

21. The polymer of claim 17, wherein:
the ethylene polymer further comprises an additive selected from an antioxidant, an acid scavenger, an antiblock additive, a slip additive, a colorant, a filler, a polymer processing aid, a UV additive, or a combination thereof; and the ethylene polymer comprises an ethylene/1-butene copolymer, an ethylene/1-hexene copolymer, an ethylene/1-octene copolymer, or a combination thereof.

* * * * *